US012017633B2

(12) United States Patent
Sheidler et al.

(10) Patent No.: US 12,017,633 B2
(45) Date of Patent: Jun. 25, 2024

(54) INTELLIGENT POWER ALLOCATION SYSTEMS ONBOARD HYBRID COMBINES AND ASSOCIATED METHODS

(71) Applicant: Deere & Company, Moline, IL (US)

(72) Inventors: Alan D. Sheidler, Moline, IL (US); Bhupesh Agrawal, Udaipur (IN); Padmakar Surwade, Muktainagar (IN)

(73) Assignee: DEERE & COMPANY, Moline, IL (US)

( * ) Notice: Subject to any disclaimer, the term of this patent is extended or adjusted under 35 U.S.C. 154(b) by 732 days.

(21) Appl. No.: 17/211,342

(22) Filed: Mar. 24, 2021

(65) Prior Publication Data
US 2022/0304240 A1    Sep. 29, 2022

(51) Int. Cl.
*B60W 10/08* (2006.01)
*B60K 6/12* (2006.01)
(Continued)

(52) U.S. Cl.
CPC ............... *B60W 10/08* (2013.01); *B60K 6/12* (2013.01); *B60L 50/15* (2019.02); *B60L 53/24* (2019.02);
(Continued)

(58) Field of Classification Search
CPC .. B60W 10/08; B60W 10/06; B60W 2510/06; B60W 2300/15; B60W 30/188;
(Continued)

(56) References Cited

U.S. PATENT DOCUMENTS

| 7,276,806 B1 | 10/2007 | Sheidler et al. |
| 7,446,426 B2 | 11/2008 | Sheidler et al. |
| (Continued) | | |

FOREIGN PATENT DOCUMENTS

| CN | 101092110 A | * 12/2007 | ............... B60K 6/26 |
| CN | 108349488 B | * 3/2021 | ............. B60K 6/442 |
| (Continued) | | | |

OTHER PUBLICATIONS

U.S. Appl. No. 17/201,954, filed Mar. 15, 2021.

*Primary Examiner* — Arpad Fabian-Kovacs
(74) *Attorney, Agent, or Firm* — KLINTWORTH & ROZENBLAT IP LLP

(57) ABSTRACT

Embodiments of an intelligent power allocation system include a ground traction undercarriage controllable to propel a hybrid combine over terrain, a separator device configured to separate grain from other crop material ingested by the hybrid combine, a mechanical powertrain including an internal combustion engine, and an electric drive subsystem containing a rechargeable battery pack and a motor/generator (M/G). A controller architecture is configured to monitor a current separator load placed on the hybrid combine when driving movement of the separator device during active harvesting. The controller architecture further selectively places the intelligent power allocation system in a separator power splitting mode in which the M/G and the internal combustion engine concurrently drive movement of the separator device based, at least in part, on whether the current separator load exceeds an upper load threshold.

20 Claims, 9 Drawing Sheets

(51) Int. Cl.
*B60L 50/15* (2019.01)
*B60L 53/24* (2019.01)
*B60W 10/06* (2006.01)
*B60W 20/15* (2016.01)
*B60W 30/188* (2012.01)
*E02F 9/20* (2006.01)
*A01D 69/02* (2006.01)
*A01F 12/18* (2006.01)
*A01F 12/56* (2006.01)
*B60K 6/08* (2006.01)
*B60L 53/00* (2019.01)
*F02D 25/00* (2006.01)

(52) U.S. Cl.
CPC ............ *B60W 10/06* (2013.01); *B60W 20/15* (2016.01); *B60W 30/188* (2013.01); *E02F 9/2075* (2013.01); *A01D 69/025* (2013.01); *A01F 12/18* (2013.01); *A01F 12/56* (2013.01); *B60K 6/08* (2013.01); *B60L 53/00* (2019.02); *B60L 2200/40* (2013.01); *B60W 2300/15* (2013.01); *B60W 2300/158* (2013.01); *B60W 2510/06* (2013.01); *B60Y 2200/222* (2013.01); *E02F 9/2058* (2013.01); *F02D 25/00* (2013.01); *Y02T 10/62* (2013.01)

(58) Field of Classification Search
CPC ........ B60W 20/15; Y02T 10/62; F02D 25/00; E02F 9/2075; E02F 9/2058; B60Y 2200/222; B60L 2200/40; B60L 53/24; B60L 53/00; B60L 50/15; B60K 6/12; B60K 6/08; A01F 12/58; A01F 12/56; A01F 12/18; A01D 69/025; A01D 41/1274
See application file for complete search history.

(56) References Cited

U.S. PATENT DOCUMENTS

| | | | |
|---|---|---|---|
| 7,779,616 B2 | 8/2010 | Sheidler et al. | |
| 7,788,889 B2 | 9/2010 | Sheidler | |
| 7,801,653 B2 | 9/2010 | Sheidler et al. | |
| 7,974,757 B2 * | 7/2011 | Mackin | B60L 50/15 701/50 |
| 7,992,370 B2 | 8/2011 | Sheidler et al. | |
| 8,008,800 B2 * | 8/2011 | Mackin | A01D 41/1274 307/25 |
| 8,087,900 B2 | 1/2012 | Mackin et al. | |
| 8,209,095 B2 * | 6/2012 | Mackin | A01D 41/127 701/50 |
| 8,897,943 B2 | 11/2014 | Sheidler et al. | |
| 8,897,972 B2 * | 11/2014 | Mackin | A01D 41/1274 701/50 |
| 9,038,759 B2 | 5/2015 | Kaneko et al. | |
| 9,067,493 B2 | 6/2015 | Husson et al. | |
| 9,254,833 B2 | 2/2016 | Shin et al. | |
| 9,637,000 B2 | 5/2017 | Husson et al. | |
| 10,773,704 B1 | 9/2020 | Rollinger et al. | |
| 2009/0156068 A1 * | 6/2009 | Barrett | B60K 1/02 440/49 |
| 2009/0294191 A1 | 12/2009 | Sheidler et al. | |
| 2009/0308036 A1 * | 12/2009 | Sheidler | A01D 69/025 60/719 |
| 2018/0177133 A1 | 6/2018 | Heyne et al. | |
| 2022/0135018 A1 * | 5/2022 | Sheidler | A01D 41/127 56/10.2 A |

FOREIGN PATENT DOCUMENTS

| | | | | |
|---|---|---|---|---|
| CN | 112449816 B | * | 5/2022 | ............ A01B 69/007 |
| CN | 115380700 A | * | 11/2022 | ......... A01D 41/1278 |
| DE | 102004043346 A1 | * | 3/2006 | ............ B60W 10/06 |
| EP | 2057881 A2 | * | 5/2009 | ......... A01D 41/1274 |
| EP | 2068045 A2 | * | 6/2009 | ........ B60W 30/1882 |
| EP | 2100787 A2 | * | 9/2009 | ............ A01D 41/127 |
| JP | 2001320805 A | | 11/2001 | |
| JP | 2004073006 A | | 3/2004 | |
| JP | 2008042960 A | * | 2/2008 | ............ B60K 6/445 |
| JP | 2011045324 A | | 3/2011 | |
| JP | 2011067155 A | | 4/2011 | |
| JP | 2012055223 A | | 3/2012 | |
| JP | 2013070642 A | | 4/2013 | |
| JP | 2013070644 A | | 4/2013 | |
| JP | 2016047005 A | * | 4/2016 | ............ B60L 15/06 |
| JP | 2017030517 A | * | 2/2017 | ............ B60K 6/445 |
| WO | WO-2011161814 A1 | * | 12/2011 | ............ B60K 6/442 |
| WO | WO-2011161816 A1 | * | 12/2011 | ............ B60K 6/445 |

* cited by examiner

INTELLIGENT POWER ALLOCATION SYSTEMS ONBOARD HYBRID COMBINES AND ASSOCIATED METHODS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to intelligent power allocation systems onboard hybrid combines, which actively vary power source combinations utilized to drive separator rotor rotation and other combine functions.

BACKGROUND OF THE DISCLOSURE

Combine harvesters (also referred to as "agricultural combines") have greatly improved the efficiency with which corn, canola, soybeans, wheat, oats, paddy, sunflowers, and other crops are harvested, threshed, cleaned, and collected for distribution to consumers. Generally, combine harvesters are relatively complex, self-propelled machines capable of harvesting large swathes of crop plants as the harvester travels over a crop field, while separating unbroken grain from broken grain and material other than grain or "MOG." Traditionally, a combine harvester is powered utilizing a high power output internal combustion engine, such as a heavy duty diesel engine, capable of powering all combine harvester functions under peak load conditions, including ground propulsion and rotation of the separator rotor or rotors contained in the combine. More recently, hybrid combine harvesters or "hybrid combines," which utilize internal combustion engines in combination with battery powered electric drives to power combine functions, have been developed and commercially introduced. Relative to combines exclusively powered through mechanical powertrains and internal combustion engines, hybrid combines offer the potential to increase fuel efficiency, reduce emissions, minimize operational noise levels, and provide other benefits, typically with tradeoffs in increased system complexity and production costs.

SUMMARY OF THE DISCLOSURE

Intelligent power allocation systems for usage onboard combine harvesters are disclosed. Embodiments of the intelligent power allocation system include a ground traction undercarriage controllable to propel the hybrid combine over terrain, a separator device configured to separate grain from other crop material ingested by the hybrid combine, a mechanical powertrain including an internal combustion engine mechanically linked to the separator device, and an electric drive subsystem mechanically linked to the separator device and to the ground traction undercarriage. The electric drive subsystem contains a rechargeable battery pack and a motor/generator (M/G), which is electrically coupled to the rechargeable battery pack. A controller architecture is coupled to the mechanical powertrain and to the electric drive subsystem. The controller architecture is configured to: (i) monitor a current separator load placed on the hybrid combine when driving rotation of the separator device during active harvesting; and (ii) based, at least in part, on whether the current separator load exceeds an upper load threshold, selectively place the intelligent power allocation system in a separator power splitting mode in which the M/G and the internal combustion engine concurrently drive movement of the separator device.

Methods carried-out by a controller architecture, which is included in an intelligent power allocation system deployed onboard a hybrid combine, are further disclosed. The hybrid combine includes a separator rotor, an internal combustion engine, and an electric drive subsystem containing an M/G and a rechargeable battery pack. Embodiments of the method include the steps or processes of: (i) monitoring, at the controller architecture, a current separator load placed on the hybrid combine when driving rotation of the separator rotor during active harvesting; and (ii) based, at least in part, on whether the current separator load exceeds an upper load threshold, selectively placing the intelligent power allocation system in a separator power splitting mode in which the M/G and the internal combustion engine concurrently drive rotation of the separator rotor.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
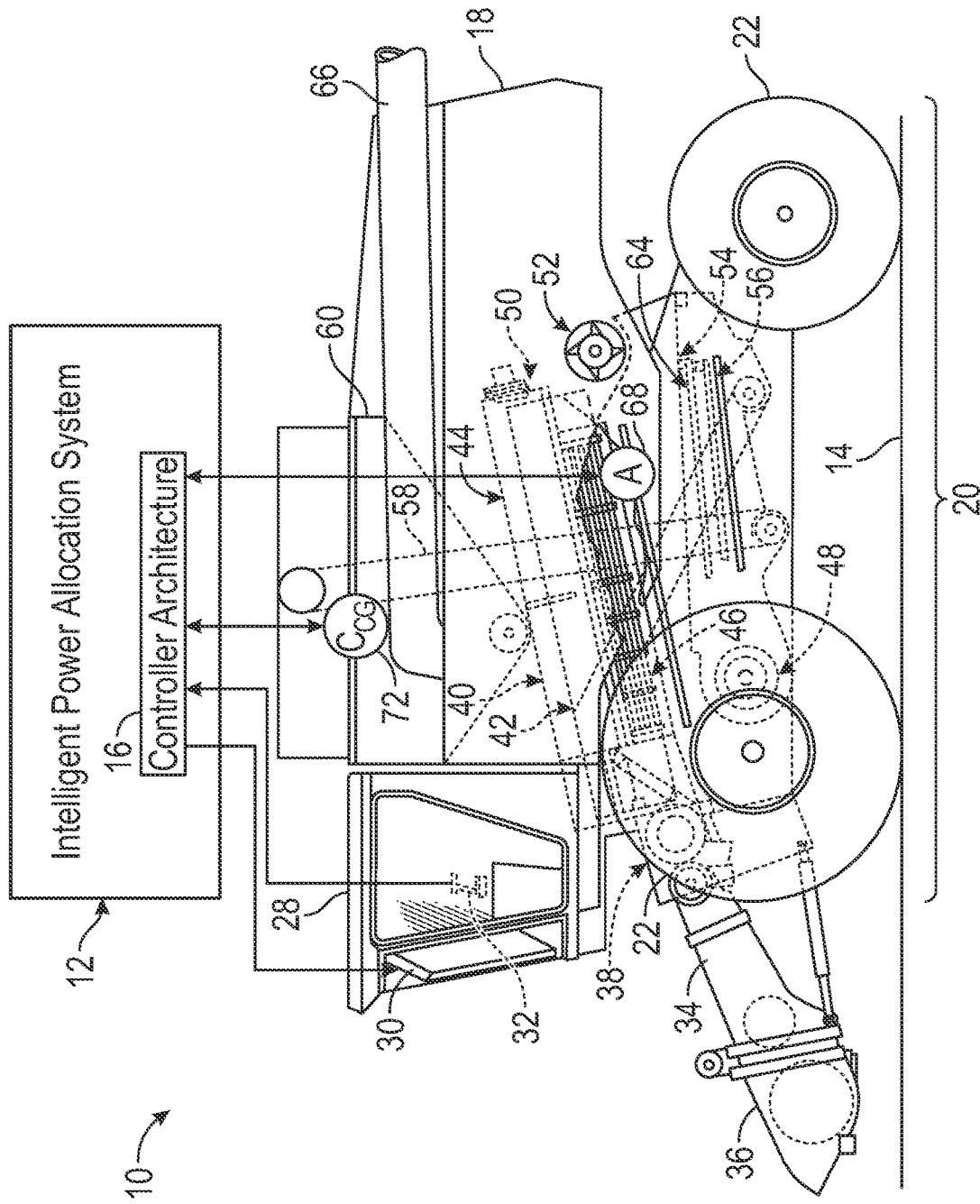
FIG. 1 is a schematic of a hybrid combine harvester or "hybrid combine" equipped with an intelligent power allocation system, which strategically varies the power source combinations utilized to power different combine functions during hybrid combine operation, as illustrated in accordance with an example embodiment.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As discussed briefly above, hybrid combines offer the potential to boost fuel efficiency, reduce emission levels, and provide other benefits relative to comparable combines powered exclusively utilizing internal combustion engines (herein, "combine engines"). While existing hybrid combine designs achieve such benefits to varying extents, a continued industry demand persists for hybrid combine advancements enabling still further improvements in fuel efficiency levels, emission suppression, operational noise reduction (particularly "drive-by" noise levels occurring during roadway transport), and other aspects of hybrid combine performance. Additionally, advancements in hybrid combine design supportive of engine downsizing or "right sizing" are sought, noting that reductions in internal combustion engine size may not only lower combine production costs, but also facilitate engine operation within optimized speed ranges to further boost engine efficiency. For example, through the incorporation of an electric drive subsystem including an electric machine (e-machine) capable of operating as an electric motor, the mechanical power output (shaft speed and torque) of the e-machine can be controlled to supplement the power output of the combine engine by summing these mechanical power outputs through a suitable drivetrain arrangement. This, in turn, allows the usage of a reduced size combine engine within hybrid combine platforms, while continuing to satisfy power output demands placed on the hybrid combine under peak load conditions with the assistance of the electric drive subsystem.

In satisfaction of these and other industrial demands, the following describes intelligent power allocation systems adapted for usage onboard hybrid combines equipped with separator devices. The term "separator device," as appearing herein, refers to a movable component or mechanism that functions to thresh or otherwise separate grain within a combine from MOG when the separator device is mechanically driven and contacted by ingested crop material. The separator device will commonly assume the form of one or more relatively long, axially-fed separator rotors (positioned lengthwise with respect to the combine chassis) and are principally described below as such. This notwithstanding, it is emphasized that the separator device may assume other forms in alternative embodiments of the intelligent power allocation system including, for example, tangentially-fed rotors and/or other movable components of the type commonly included in a cylinder-walker separator system, in a conventional tine separation (CTS) system, or in a tangential tine separation (TTS) system.

Among other components, embodiments of the intelligent power allocation system includes a processing sub-system or "controller architecture," which may be comprised of any number of individual controllers; e.g., an engine control unit, a power management control unit, and a motor/generator control unit. During operation of the hybrid combine, the controller architecture strategically places the intelligent power allocation system in different power allocation modes, which vary the power source combinations utilized to power the currently-active or presently-utilized combine harvester functions. For example, in embodiments of the intelligent power allocation system, the controller architecture may utilize persistent sensor data to monitor a current separator load placed on the hybrid combine when driving rotation of the separator rotor (or driving movement of a different separator device) during active harvesting. The controller architecture selectively places the intelligent power allocation system in a separator power splitting mode (e.g., transition from a previously-applied separator single drive mode) based, at least in part, on whether the current separator load exceeds a upper load threshold. When placed in the separator power splitting mode, the intelligent power allocation system controls the combine engine to drive rotation of the separator rotor or rotors onboard the hybrid combine, while further controlling an electric motor/generator included in the electric drive subsystem to simultaneously contribute to powering separator rotor rotation. In other instances, the intelligent power allocation may instead operate in separator single drive mode in which separator rotor rotation (or movement of another type of separator device onboard the combine) is driven exclusively by the combine engine or the motor/generator within the electric drive subsystem depending upon, for example, the hybrid combine design and the overall capabilities of the electric drive subsystem.

As previously noted, embodiments of the intelligent power allocation system include at least a first electric machine (e-machine) in the form of a motor/generator. As appearing herein, the term "motor/generator," abbreviated as "M/G," refers to an e-machine capable of serving an electric motor when energized such that the motor shaft rotates in a given rotational direction, and further capable of serving as an electrical generator when back-driven by imparting rotary motion to the rotary input/output (I/O) of the M/G, such as an M/G shaft. In certain embodiments, the electric drive subsystem may contain a single e-machine (the M/G), which is utilized to jointly drive the separator rotor(s) in combination within the combine engine when operating in the separator power splitting mode and which may be selectively back-driven by the combine engine to generate electrical power in certain operational scenarios, as described below. This stated, embodiments of the electric drive subsystem are beneficially imparted with a unique, dual e-machine architecture including a second e-machine in addition to the above-described M/G. In such embodiments, the second e-machine may assume the form of an electric motor, referred to herein more fully as an "electric ground traction motor," which can be controlled to vary the ground speed and direction of travel of the hybrid combine. The electric ground traction motor and the M/G are electrically coupled to a common battery module or pack, which is further included in the electric drive subsystem and which has a rechargeable chemistry. The rechargeable battery pack may be imparted with relatively expansive storage capacity such that the battery pack may be capable of solely powering combine operation for an extended period of time (e.g., on the order of an hour) during roadway transport and/or operation in other light load conditions. Overall, such a dual e-machine architecture imparts the electric drive system and, more broadly, the intelligent power allocation system with a high degree of flexibility in selecting different power source combinations to provide a range of power allocation modes well-suited for usage across different operational scenarios to optimize the overall efficiency of the hybrid combine.

Through the selective or strategic application of the separator power splitting mode, a default mechanical power supply can be utilized to drive separator rotor rotation under low to moderate separator load conditions, with both power supplies (the combine engine and the electric drive subsystem) driving separator rotor rotation under heavier load conditions. For example, in embodiments in which the combine engine is principally utilized to drive separator rotation, the M/G contained in the electric drive subsystem may be energized to provide a power boost functionality in instances in which the separator rotor load increases above a predetermined threshold value (herein, an "upper load threshold') due to, for example, processing of higher crop densities or transient peak load conditions occurring when the hybrid combine encounters crop plugs or patches of relatively dense, wet crop. Additionally, in at least some implementations, the controller architecture may control the power output of the M/G to as a function of separator load under such heavy load conditions to reduce pronounced variations in combine engine loading (referred to as "combine engine load leveling"). Concurrently, in at least some embodiments, the intelligent power allocation system may selectively enable back-driving of the M/G and recharging of the battery pack under light separator load conditions to, for example, increase the consistency with which rotation of the combine engine output shaft is maintained within an optimized, quasi-isochronous speed range. In this manner, combine engine performance and efficiency is boosted by enabling the combine engine output shaft to rotate over an increasingly optimized, consistent speed range during combine operation, or by otherwise utilizing the electric drive subsystem to provide load leveling of the combine engine. Lastly, in still other implementations, and depending upon electric drive subsystem capabilities, the electric drive subsystem may be utilized to drive rotation of the separator rotor (or rotors) under light to moderate load conditions, with the combine engine utilized to provide additional power assistance on an as-needed basis.

Regardless of whether the combine engine or the electric drive subsystem powers separator rotor rotation in the separator single drive mode, embodiments of the intelligent power allocation system may be operable in still further power allocation modes including, for example, a battery powered transport mode. When placed in this power allocation mode, the intelligent power allocation system utilizes the electric drive subsystem to power (that is, mechanically drive) the ground traction undercarriage and thereby propel the hybrid combine over the ground, roadways, or other terrain. Through the usage of battery power when the combine harvester is engaged in non-harvest transport, particularly in geographical regions in which the duration or distance of combine travel to and from a crop field or other agricultural area subject to harvesting is relatively lengthy, the usage of the combine engine may be minimized to conserve fuel and reduce emissions. Drive-by noise levels occurring are also minimized through the usage of the relatively quiet electric drive subsystem during combine transport. However, the combine engine can also be utilized to exclusively power (or to assist in powering) the ground traction undercarriage during roadway transport when, for example, the battery pack is depleted or the current state-of-charge of the battery pack falls below a predetermined SoC threshold. For example, in embodiments, the controller architecture may electively place the hybrid combine in a battery powered transport mode when the hybrid combine engages in non-harvest transport and a current state-of-charge (SoC) of the battery pack exceeds a predetermined minimum SoC threshold. Comparatively, an engine powered transport mode may be activated when the hybrid combine is engaged in non-harvest transport and the current battery pack SoC is equal to or less than the minimum SoC threshold, with the combine engine exclusively or at least predominately supplying mechanical power to the ground traction undercarriage in the engine powered transport mode.

Embodiments of the intelligent power allocation system may be operable in yet further power allocation modes in addition to or in lieu of those just described. For example, the intelligent power allocation system may further permit operation in an electric drive-assisted start mode during which the electric drive subsystem is utilized to briefly back-drive the combine engine during engine startup phases, as described more fully below in connection with FIG. 9. Additionally, varying levels of algorithmic intelligence can be introduced into the intelligent power allocation system to better govern transition between the different power allocation modes and system operation in each available power allocation mode. As an example in this latter regard, embodiments of the intelligent power allocation system may transition from operation in the separator power splitting (co-drive) mode to operation in the single drive mode to prevent a current SoC of the battery pack from decreasing below a minimum SoC threshold. In this case, the minimum SoC threshold may have variable value, which is dynamically adjusted by the controller architecture to ensure that sufficient quantity of energy is retained within the battery pack to allow the hybrid combine to complete, or at least substantially complete, a return transport trip in the battery powered transport mode following active harvesting. The controller architecture may estimate battery energy stores required for the hybrid combine to complete such a return transport trip based upon, for example, operator input and/or the amount of battery stores expended during the outbound trip of the hybrid combine when initially traveling to the crop filed or agricultural site at which active harvesting occurs. In other instances, the intelligent power allocation system may not perform such a return trip battery storage reservation function, and the minimum SoC threshold may have a static value selected to prevent excessive drainage of the battery pack.

Examples of the intelligent power allocation system will now be described in the context of an example hybrid combine harvester or "hybrid combine," as illustrated and discussed below in connection with FIGS. 1 and 2. Additionally, methods or processes suitably carried-out by the controller architecture of the intelligent power allocation system to perform the various tasks or processes described herein are set-forth below in connection with FIG. 3. Lastly, several power allocation modes in which the controller architecture may potentially place the intelligent power allocation system in embodiments depending upon, for example, whether the hybrid combine is currently engaged in active harvesting or non-harvesting transport activities are discussed below in connection with FIGS. 4-9. The following description is provided by way of non-limiting illustration only and should not be construed to unduly restrict the scope of the invention as set-out appended Claims in any respect. For example, and as previously noted, alternative embodiments of the intelligent power allocation system can include a different type of separator device in additional to or in lieu of one or more separator rotors, such as tangentially-fed rotors and other movable components included in a CTS, TTS, or cylinder-walker separator system.

Example Hybrid Combine Equipped with an Intelligent Power Allocation System

Referring to FIG. 1, an example hybrid combine 10 equipped with an embodiment of an intelligent power allocation system 12 is schematically depicted. The hybrid combine 10 is presented by way of illustration to establish a non-limiting example context in which embodiments of the intelligent power allocation system 12 may be better understood. In further embodiments, the hybrid combine 10 may assume other forms and may include different combinations of components suitable for processing crop plants ingested into the hybrid combine 10 when traveling over a field 14. Further, only selected components of the intelligent power allocation system 12, such as a controller architecture 16, are shown in FIG. 1 for illustrative clarity. Further illustration and discussion of the example intelligent power allocation system 12, and operation of the intelligent power allocation system 12 when placed in different example power allocation modes, is provided below in connection with FIGS. 2-9.

The example hybrid combine 10 includes a chassis body or main frame 18, which is supported by a ground traction undercarriage 20 enabling the hybrid combine 10 to be propelled across a crop field (e.g., the field 14), public roadways, and other terrain. In the illustrated example, the ground traction undercarriage 20 is outfitted with a number of ground-engaging wheels 22, but may include tracks or a combination of wheels and tracks in further implementations. An alternative embodiment of the ground traction undercarriage 20, which includes a combination of wheels 22 and rubber tracks 62 (e.g., as may be desirable for harvesting certain crops, such as rice), is further shown in the lower left of FIG. 2. The ground traction undercarriage 20 may be selectively powered (that is, mechanically driven) utilizing an internal combustion engine 24, such as a heavy duty diesel engine, onboard the hybrid combine 10 (hereafter "combine engine 24") and included in a mechanical powertrain 26. Further, the ground traction undercarriage 20 may also be selectively powered utilizing an electric drive subsystem 74 further included in the intelligent power allocation system 12, as discussed below in connection with FIG. 2. Atop a forward portion of the main frame 18, a cabin 28 encloses an operator station including an operator's seat (not shown), at least one display device 30, and an operator interface 32. A feederhouse 34 is mounted to a forward portion of the main frame 18 of the hybrid combine 10 at an elevation generally below the cabin 28. Various harvesting heads or, more simply, "headers" are attachable to the feederhouse 34 in an interchangeable manner to, for example, allow customization of the hybrid combine 10 for harvesting particular crop types. An example of one such header, here a harvesting platform 36, is shown in FIG. 1.

As the hybrid combine 10 travels over the field 14 in a forward direction, the harvesting platform 36 gathers severed crop plants into the feederhouse 34, which then consolidates the severed crop plants for conveyance (e.g., via a non-illustrated conveyor belt contained in the feederhouse 34) into the interior of the hybrid combine 10. Within the hybrid combine 10, the crop plants are engaged by a rotating drum conveyor or "beater" 38, which directs the crop plants in a generally upward direction into a rotary threshing and separating section 40. The rotary threshing and separating section 40 can include various components for performing the desired functions of separating the grain and chaff from other plant material. The illustrated rotary threshing and separating section 40, for example, includes a crop processing drum or rotor 42 having grain separating features and rotatably mounted in a case or rotor housing 44. The drum or rotor 42 is referred to herein as a "separator rotor 42," with the term "separator rotor" utilized throughout this document to generally refer to a rotating component performing grain separation, threshing, and/or similar crop processing functions aiding in the separation of grain from other combine-ingested crop material or MOG during combine harvester operation. In the illustrated example, the hybrid combine 10 contains a single, axially-elongated separator rotor 42; however, alternative embodiments of the hybrid combine 10 may contain any practical number of separator rotors, noting that twin rotor architectures (in which two separator rotors are arranged in a side-by-side relationship) are also common. Rotation of the separator rotor 42 within the rotor housing 44 causes both grain and chaff to fall through the separation grates of a concave 46 and into the inlet of a lower grain cleaning section 48. Concurrently, straw and similar MOG is directed toward an outlet end 50 of the rotary threshing and separating section 40 and is ultimately delivered to another rotating drum or "discharge beater" 52 for expulsion from an aft end of the hybrid combine 10. In further embodiments, another type of separator device or mechanism may be substituted for the separator rotor 42, such as tangentially-fed rotors or other movable components of the type commonly included in a CTS, TTS, or cylinder-walker separator system.

Discussing now the grain cleaning section 48 in greater detail, this section of the hybrid combine 10 includes various components adapted to clean the newly-harvested grain, while further separating the chaff therefrom. Such components may include a chaffer 54, a sieve 56, and any number of fans (not shown). By action of the grain cleaning section 48, the newly-cleaned grain is directed into a clean grain elevator 58 for conveyance upwardly into a storage reservoir or grain tank 60 of the hybrid combine 10. At least one camera 72 may be positioned to capture imagery of the grain transported along the bulk grain stream. Specifically, in embodiments and as indicated in FIG. 1, such a "clean grain" camera 72 may be positioned adjacent the clean grain elevator 58 to capture imagery of the bulk grain transported via the elevator 58 into the grain tank 60. As the clean grain elevator 58 transports the newly-harvested grain into the grain tank 60, tailings fall onto a return elevator 64 extending across a lower portion of the clean grain elevator 58. The return elevator 64 then recycles the tailings back to the inlet of the separator rotor 42 for further threshing to allow the above-described grain processing steps to repeat and maximize the grain yield of the hybrid combine 10.

In the above-described manner, the hybrid combine 10 effectively intakes severed crop plants from the field 14, extracts grain from the crop plants, cleans the newly-extracted grain, and then stores the clean grain in the grain tank 60 for subsequent unloading utilizing, for example, an unloading auger 66. Also, during operation of the hybrid combine 10, certain components within the hybrid combine 10 may be positionally adjusted or the operating parameters of such components may be modified utilizing any number of actuators 68, such as hydraulic- or electrically-controlled linear or rotary actuators, one of which is generically represented by symbol 68 in FIG. 1. In this regard, the operational speeds of any number of fans or conveyor belts may be varied, as may the position of any number of non-illustrated deflectors, chaffer components, sieve components, or the like. Such actuators 68 may be controlled in response to operator input received via the operator interface 32 located within the cabin 28, controlled via command signals issued by the controller architecture 16 included in the intelligent power allocation system 12, or otherwise commanded by another controller or control unit onboard the hybrid combine 10.

The operator interface 32 located within the cabin 28 can include any device or group of devices utilized by an operator to pilot the hybrid combine 10 and, potentially, to control the intelligent power allocation system 12 and provide operator input thereto. In implementations, the operator interface 32 may be partially integrated into or otherwise associated with the display device 30 in some manner. For example, the operator interface 32 may include physical inputs (e.g. buttons, switches, dials, or the like) located on or proximate the display device 30, a touchscreen module integrated into the display device 30, or a cursor input device (e.g., a joystick, trackball, or mouse) for positioning a cursor utilized to interface with graphic user interface (GUI) elements generated on the display device 30. In many instances, the operator interface 32 will include at least one control level 70 (shown in FIG. 2) for controlling the ground speed and direction of travel of the hybrid combine 10. When present within the cabin 28 and manipulated by an operator, the control level 70 provides operator input signals to the controller architecture 16 of the intelligent power allocation system 12: e.g., movement of the control lever may be translated to a continuously variable electrical signal, which is supplied to the controller architecture 16 to consume as an input in commanding the below-described electric ground traction motor 98. Finally, the hybrid combine 10 contains various other components including an array of sensors in addition to those previously mentioned, which may supply data to the controller architecture 16 consumed as inputs during operation of the intelligent power allocation system 12. A non-exhaustive list of such sensors includes grain moisture sensors, mass flow sensors, grain tank load cells, and strike sensors (or other sensors) for measuring grain loss.

Figure 2:
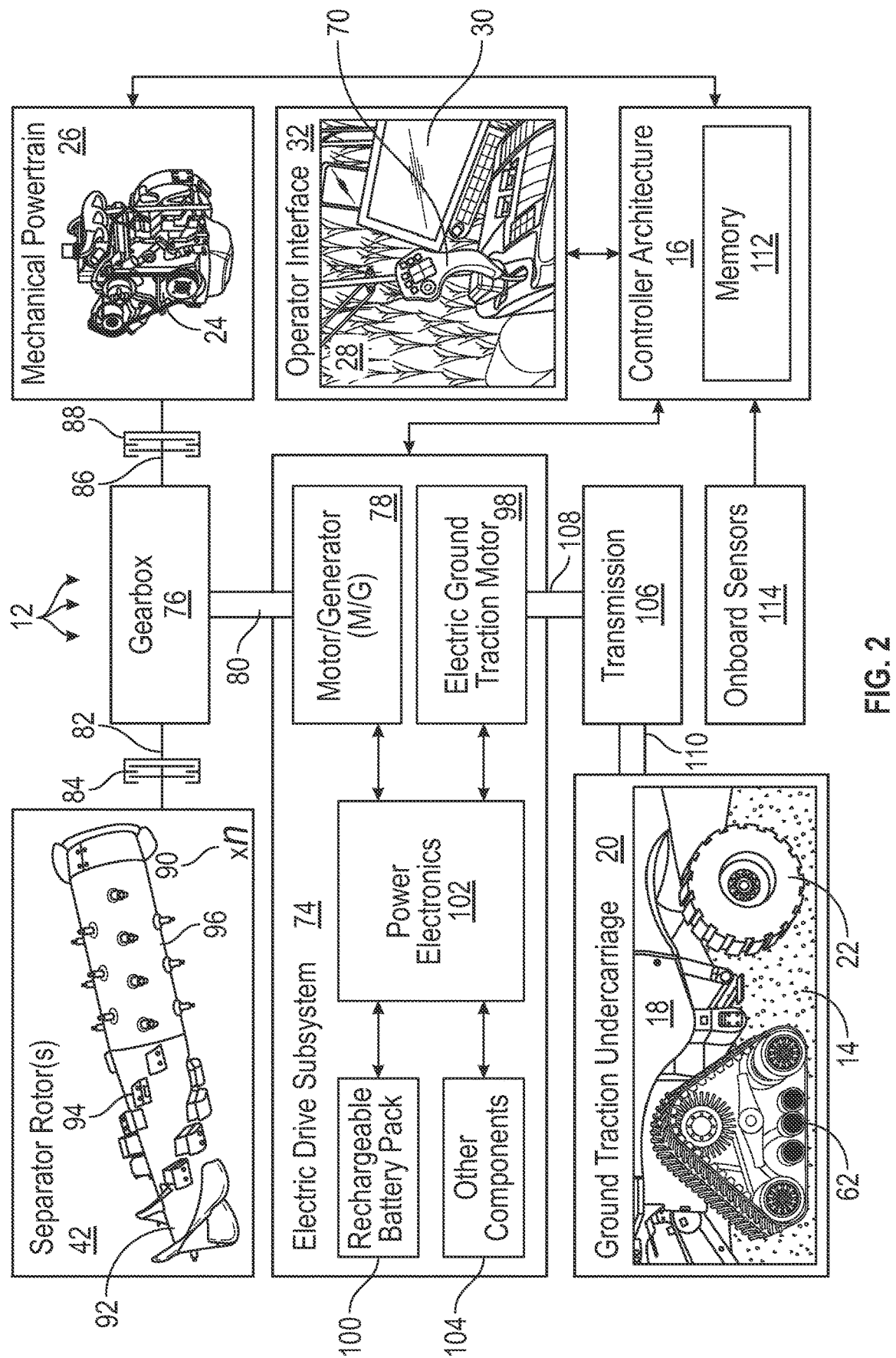
FIG. 2 schematically illustrates an example embodiment of the intelligent power allocation system in greater detail and including, among other components, a separator device (here, at least one separator rotor), a mechanical powertrain containing an internal combustion engine, an electric drive subsystem containing a rechargeable battery pack, a ground traction undercarriage, and a controller architecture.

Advancing to FIG. 2, the example intelligent power allocation system 12 is schematically depicted in a more comprehensive manner. In the illustrated embodiment, the intelligent power allocation system 12 includes an electric drive subsystem 74, which is mechanically linked to the separator rotor 42 through a gearbox 76. The electric drive subsystem 74 contains a first e-machine in the form of a motor/generator (M/G) 78 having a rotary shaft, collar, or other rotational component serving as a rotary I/O of the M/G 78. The rotary I/O of the M/G 78 is mechanically coupled to a corresponding rotary I/O of the gearbox 76 by at least one shaft 80 (e.g., the shaft of M/G 78) and, perhaps, any additional number and type of additional driveline components suitable for transmitting rotary motion between the M/G 78 and the gearbox 76. Comparatively, a rotary output of the gearbox 76 is mechanically linked to the separator rotor 42 through an additional driveline 82 including one or more rotatable shafts. In embodiments, a clutch 84 (e.g., a first hydraulically-actuated clutch pack) may be positioned in the driveline 82, with the controller architecture 16 capable of engaging and disengaging the clutch 84 as appropriate to implement the below-described power allocation modes. Similarly, a rotary input of the gearbox 76 is mechanically linked to the output shaft of the engine 24 (and, more broadly, of the mechanical powertrain 26) through a driveline 86, which may likewise include a clutch 88 (e.g., a second hydraulically-actuated clutch pack) in at least some instances. By virtue of the above-escribed structural arrangement, the combine engine 24, the M/G 78, or a combination of the combine engine 24 and the M/G 78 may drive rotation of the separator rotor 42 through the gearbox 76 when so commanded in by the controller architecture 16 in response to operator input commands or variations in the operational conditions to which the hybrid combine 10 is subjected. Moreover, at certain operational junctures, the combine engine 24 may back drive rotation of the M/G 78 through the gearbox 76 when the M/G 78 is utilized as an electric generator, as described below in conjunction with at least FIGS. 5 and 8.

As indicated in FIG. 2 by a symbol 90, the hybrid combine 10 can contain any practical number of separator rotors 42 disposed in the rotary threshing and separating section 40 of the hybrid combine 10. In many instances, and as generally illustrated, the hybrid combine 10 may contain a single, relatively lengthy separator rotor 42. In other instances, the hybrid combine 10 may contain twin separator rotors 42, which are positioned in a side-by-side relationship and which co-rotate to process harvested crop material during active harvesting by the hybrid combine 10. The separator rotor or rotors contained in the hybrid combine 10 can possess various different form factors and structure features, providing that the separator rotor(s) serve to separate grain from MOG when rotationally driven and contacting crop material processed within the rotary threshing and separating section 40. In the illustrated example, specifically, the single separator rotor 42 includes three axially-distributed sections 92, 94, 96: (i) a leading feed section 92, (ii) an intermediate threshing section 94, and (iii) a trailing separator section 96. These sections are each equipped with protruding veins, paddles, or similar features, which are shaped, sized, and distributed to perform the desired crop processing functions.

In other implementations, the structural features or characteristics of the separator rotor 42 may differ, providing that the separator rotor 42 functions to separate, thresh, or otherwise process crop material contacting the spinning rotor 42 to promote grain separation from the remainder ingested crop material. The following primarily discussed power allocation or power distribution to the separator rotor 42 in the various modes available to the intelligent power allocation system 12 given, of the harvesting-related combine functions, the separator rotor 42 typically places the greatest load on the hybrid combine 10; however, for completeness, it is noted that the below-described power distribution schemes discussed in the context of powering separator rotor rotation are equally applicable to powering the other harvesting-related functions of the hybrid combine 10 including, for example, the action of the grain cleaning section 48 discussed above in connection with FIG. 1.

In addition to the M/G 78, the electric drive subsystem 74 also includes a second e-machine in the form of an electric motor 98 (hereafter "electric ground traction motor 98") in the illustrated embodiment of the intelligent power allocation system 12. Still further components that may be included in the electric subsystem 74 include a rechargeable battery pack 100, and power electronics 102 electrically coupling the battery pack 100 to the e-machines 78, 98. The power electronics 102 can similarly include various electronic components for regulating and routing current flow and voltages between the rechargeable battery pack 100 and the e-machines 78, 98. So too may the electric drive subsystem 74 include any number and type of additional components 104, such as M/G or motor control units; sensors for monitoring characteristics pertaining to the electric drive subsystem 74, such as current battery SoC, the rotational speed of the e-machines 78, 98, and parameters indicative of battery health; thermal regulation devices for maintaining the battery pack 100 within optimal temperature ranges during combine operation and during charging periods; and other such components commonly integrated into modern high capacity battery modules and electric drive subsystems, generally.

The battery pack 100 may contain any number of interconnect battery cells, with the term "battery pack," as appearing throughout this document, utilized in a broad sense to refer to a chemical energy storage device or system, regardless of the number of cells included in the battery pack or the other design specifics of the battery pack. The battery pack 100 contains a rechargeable chemistry, such as a lithium ion chemistry or a nickel-cobalt-aluminum (NCA) chemistry, and may have a relatively expansive storage capacity; e.g., a storage capacity exceeding 10 kilowatt hours (kWh) and, perhaps, approaching or exceeding 20 kWh in embodiments. When the battery pack 100 is fully charged, such an energy storage capacity may enable operation of the hybrid combine 10 solely utilizing battery power for a relatively lengthy time period (e.g., on the order of an hour) when the power output demands placed on the hybrid combine 10 remain in a relatively low to moderate range, as may occur during prolonged roadway transport. Accordingly, in embodiments, the battery pack 100 may be utilized to power the electric ground traction motor 98, when so commanded by the controller architecture 16, with a rotary output of the electric ground traction motor 98 mechanically coupled to a rotary input of a transmission 106 through one or more shafts 108. A rotary output of the transmission 106 is, in turn, mechanically linked to the driven wheels 22 and/or the tracks 62 via one or more shafts 110 and any number of additional axles, gears, sprockets, and other such mechanical components commonly utilized within combine ground traction undercarriages.

The controller architecture 16 of the intelligent power allocation system 12 can assume any form suitable for performing the functions described throughout this document. The term "controller architecture," as appearing herein, is utilized in a non-limiting sense to generally refer to the processing architecture of the intelligent power allocation system 12. The controller architecture 16 can encompass or may be associated with any practical number of processors, control computers, computer-readable memories, power supplies, storage devices, interface cards, and other standardized components. In this regard, and as noted briefly above, the controller architecture may be comprised of any number of individual processors and controllers onboard the hybrid combine 10, which may include an engine control unit in embodiments, as indicated by the signal communication line extending between the mechanical powertrain 26 and the controller architecture 16. Although illustrated as separate from the electric drive subsystem 74 for illustrative clarity, the controller architecture 16 may be contained in (or may include certain processing components included in) the electric drive subsystem 74 in embodiments, such as a non-illustrated power management control unit, any number of e-machine control units, or other components coinciding with the power electronics 102. The controller architecture 16 may also include or cooperate with any number of firmware and software programs or computer-readable instructions designed to carry-out the various process tasks, calculations, and control/display functions described herein. Such computer-readable instructions may be stored within a non-volatile sector of a computer-readable memory 112 accessible to the controller architecture 16. While generically illustrated as a single block, the memory 112 can encompass any number and type of storage media suitable for storing computer-readable code or instructions, as well as other data utilized to support the operation of the intelligent power allocation system 12; e.g., the below-described threshold values utilized by the controller architecture 16 in identifying the appropriate junctures to switch between different power allocation modes and perform other actions.

Any number and type of sensors 114 may further be located onboard the hybrid combine 10 and coupled to the controller architecture 16. Such sensors 114 may supply data to the controller architecture 16 indicative of the current separator rotor load, the load fraction placed directly on the combine engine 24, the load fraction placed directly on the M/G 78 and the electric ground traction motor 98, the current SoC of the rechargeable battery pack 100, and other such data parameters consumed by the controller architecture 16 as inputs in determining the appropriate power allocation mode in which to place the intelligent power allocation system 12 at a given juncture in time. The controller architecture 16 may receive operator input commands entered via operator interaction with the operator interface 32 including, for example, movement of the above-described control handle or lever 70. For example, in embodiments, an operator may move the control lever 70 in forward or backward directions to varying extents to control the ground speed and direction of travel of the hybrid combine 10. Such control interfaces are conventionally deployed onboard modern combine harvesters, often with hydrostatic drives or transmissions providing a continuously or infinitely variable transmission converting mechanical output from an internal combustion engine, such as the combine engine 24, to a desired wheel or track speed. The controller architecture 16 may receive input commands via movement of the control lever 70 and translate such input commands into appropriate speed commands supplied to the electric drive subsystem 74 and, in the illustrated example, specifically supplied to the electric ground traction motor 98; e.g., through the power electronics 102.

In embodiments, the controller architecture 16 may control the electric ground traction motor 98 in response to control lever movement in a manner emulating or mimicking a hydrostatic transmission or drive to promote operator familiarity. In this regard, the electric ground traction motor 98 may be controlled by the controller architecture 16 (including or cooperating with the power electronics 102, potentially including a potentiometer or another device for generating a continuously variable voltage output signal in response to control lever movement) to mimic the manner in which certain legacy hydrostatic transmission systems translate control lever movement to changes in hydrostatic pump/motor speed and direction and, particularly, to control the electric ground traction motor 98 in a manner emulating the responsiveness and "feel" perceived by operators when interacting with such legacy hydrostatic transmission systems onboard combines. In other embodiments, this may not be the case; or, perhaps, an operator may be permitted to select the particular manner in which control lever movement is interpreted and applied as a customizable setting. In still other cases, a different interface may be utilized by an operator to control the ground speed and direction of travel of the hybrid combine 10.

Figure 3:
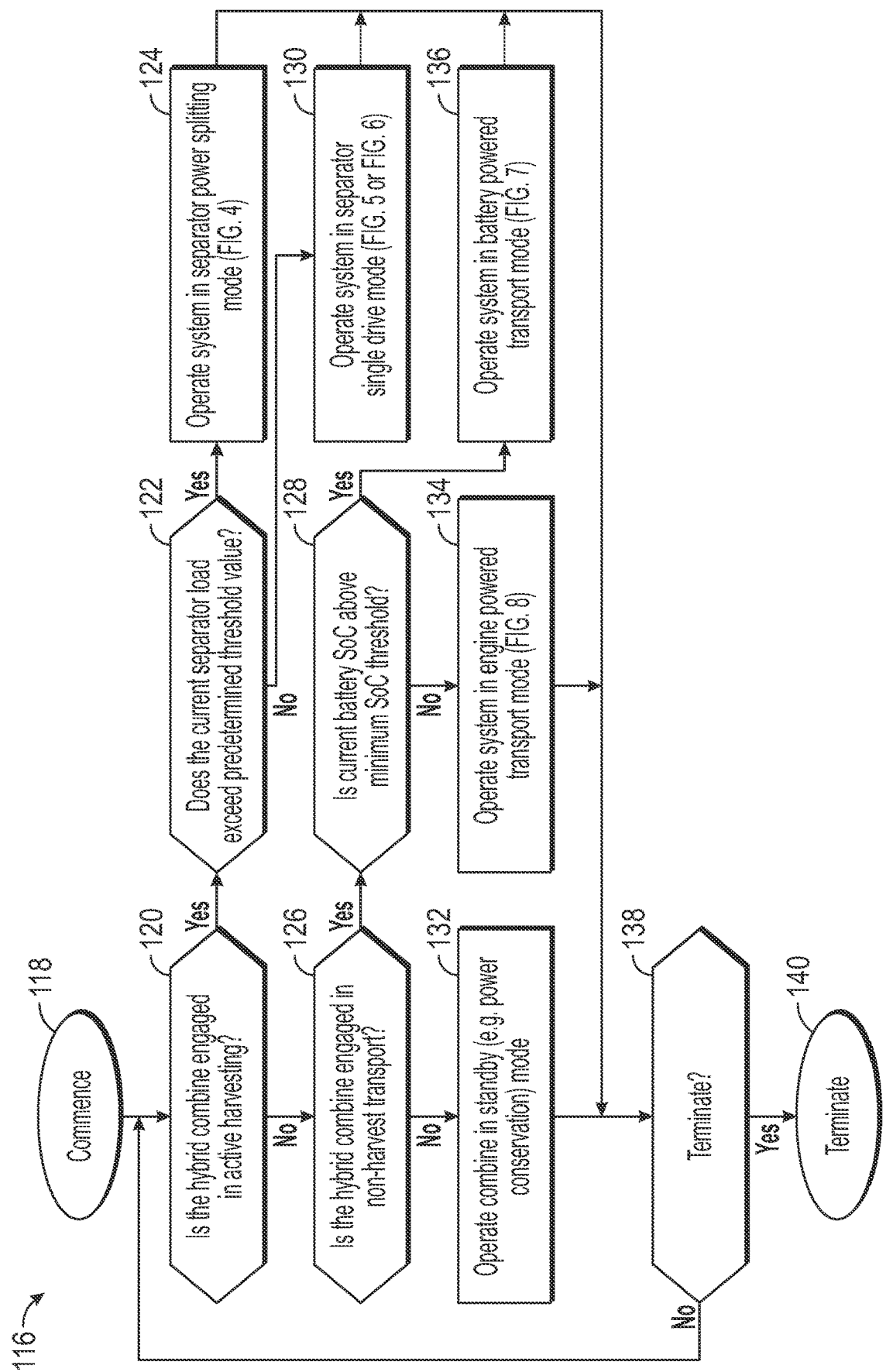
FIG. 3 is a flowchart of an example process suitably carried-out by the controller architecture of the intelligent power allocation system (FIGS. 1 and 2) to actively switch the intelligent power allocation system between different power allocation modes during operation of the hybrid combine.

Referring now to FIG. 3, an intelligent power allocation method 116 is presented in accordance with an example embodiment of the present disclosure. The intelligent power allocation method 116 may be carried-out by the controller architecture 16 (FIGS. 1 and 2) in actively switching the intelligent power allocation system 12 between two or more power allocation modes during operation of the hybrid combine 10. In the illustrated example, the intelligent power allocation method 116 includes a number of process STEPS 118, 120, 121, 122, 124, 126, 128, 130, 132, 134, 136, 138, 140, each of which is described, in turn, below. Depending upon the particular manner in which the intelligent power allocation method 116 is implemented, each step generically illustrated in FIG. 3 may entail a single process or multiple sub-processes. Further, the steps illustrated in FIG. 3 and described below are provided by way of non-limiting example only. In alternative embodiments of the intelligent power allocation method 116, additional process steps may be performed, certain steps may be omitted, and/or the illustrated process steps may be performed in alternative sequences.

At STEP 118, the controller architecture 16 of the intelligent power allocation system 12 commences performance of the intelligent power allocation method 116 in response to the occurrence of a predetermined trigger event. Generally, the intelligent power allocation method 116 may be triggered or initiated in response to startup of the hybrid combine 10 or, perhaps, other events indicating that the hybrid combine 10 is likely to engage in active harvesting or roadway transport in a near term timeframe. Further, in certain cases, an operator may be permitted to activate and deactivate (or customize) the intelligent power allocation method 116 through interaction with a settings page or screen accessible utilizing a graphic user interface (GUI) generated on the display device 30 located in the hybrid combine cabin 28. In certain cases, for example, an operator may be able to override the battery powered transport mode in favor of a hybrid or engine powered transport mode; e.g., by interacting with the operator interface 32 to enable a performance mode. Additionally or alternatively, an operator may be prioritize certain performance aspects (e.g., fuel economy over performance or performance over fuel economy) when and to what extent the controller architecture 16 places the intelligent power allocation method 116 in different power allocation modes.

After commencing the intelligent power allocation method 116 (STEP 118), the controller architecture 16 advances to STEP 120 and determines whether the hybrid combine 10 is currently engaged in active harvesting. The controller architecture 16 may determine whether the hybrid combine 10 is engaged in active harvesting based upon engagement or active rotation of the separator rotor 42 (FIGS. 1 and 2), sensor input indicative of crop flow or grain through the hybrid combine 10, or any other pertinent sensor input. For example, depending upon system design, an operator piloting the hybrid combine 10 may provide input engaging the clutches 84, 88 prior to engaging in active harvesting; and, if previously inactive or maintained in a standby state due to operation in a particular power allocation mode (e.g., the battery powered transport mode), the combine engine 24 may then started or otherwise transitioned to a fully active state. If determining the hybrid combine 10 is engaged in active harvesting, the controller architecture 16 progresses to STEP 122 of the intelligent power allocation method 116 and determines whether the current separator load exceeds a corresponding an upper load threshold, which is stored in the memory 112 and which may or may not be adjustable to operator preference. Generally, the separator rotor load can be determined based upon sensor measurements and rotational shaft speeds of any shaft co-rotating with the separator rotor 42; inferred as a fractional load of the load placed on the combine engine 24, the M/G 78, or both at a given juncture in time; or otherwise determined utilizing well-established techniques and processes.

If determining the current separator load exceeds the upper load threshold at STEP 122, the controller architecture 16 operates (that is, initially places or continues to operate) the intelligent power allocation system 12 in a separator power splitting mode (STEP 124). When operating the intelligent power allocation system 12 in the separator power splitting mode, the controller architecture 16 controls the intelligent power allocation system 12 such that separator rotor 42 is rotationally driven, in a simultaneous or concurrent manner, by both the combine engine 24 and the M/G 78 of the electric drive subsystem 74. In this case, the gearbox 76 effectively sums the mechanical power inputs supplied by the combine engine 24 and the M/G 78, with the summed product then applied to the shaft of the separator rotor 42 (and also typically to the other harvesting-related functions of the combine harvester 10, such as grain cleaning). Further description of the manner which the intelligent power allocation system 12 may route power flow between different components of the combine harvester 10 when operating in separator power splitting mode is provided below in connection with FIG. 4. Next, the controller architecture 16 progresses to STEP 138 and determines whether the current iteration of the intelligent power allocation method 116 should terminate; e.g., due to hybrid combine shutdown or prolonged periods of inactivity. If determining this to be the case, the controller architecture 16 advances to STEP 140 and terminates the intelligent power allocation method 116 accordingly. Otherwise, the controller architecture 16 returns to STEP 120 and the foregoing process steps repeat.

If, during STEP 122, the controller architecture 16 instead determines that the current separator load does not exceed the predetermined threshold value stored in the memory 112 (the upper load threshold), the controller architecture 16 progresses to STEP 130 and operates the intelligent power allocation system 12 in a separator single drive mode. In this particular power allocation mode, the combine engine 24 or the M/G 78 exclusively or substantially exclusively drives rotation of the separator rotor 42. In many instances, the combine engine 24 is utilized to drive rotation of the separator rotor 42 in the separator mode, with the M/G 78 selective activated to provide power assistance under heavy load conditions via selective application of the separator power splitting mode. Such an approach or control scheme also allows the potential for back-driving the M/G 78 through the gearbox 76 to recharge the battery pack 100 and to slow the output shaft speed of the combine engine 24 under light load conditions. This, in turn, may help maintain the combine engine shaft speed in an optimized quasi-isochronous range to boost engine performance, while providing the added benefit of storing excess energy in chemical form in the battery pack 100 for subsequent usage. An example of separator single drive mode in which the combine engine 24 exclusively drives rotation of the separator rotor 42 and, perhaps, is utilized to selective back-drive the M/G 78 is set-forth below in connection with FIG. 5. These benefits notwithstanding, the M/G 78 may be employed to exclusively drive rotation of the separator rotor 42 in the separator single drive mode in other embodiments depending upon, for example, the storage capacity of the rechargeable battery pack 100 and the power output capabilities of the M/G 78 relative to those of the combine engine 24. An example of separator single drive mode in which the M/G 78 is controlled to exclusively drive rotation of the separator rotor 42 is discussed more fully below in connection with FIG. 6. After placing the intelligent power allocation system 12 in the separator single drive mode (or when continuing to operate the system 12 in this power allocation mode), the controller architecture 16 advances to STEP 138 and determines whether the current iteration of the intelligent power allocation method 116 should terminate in the manner previously described.

With continued reference to FIG. 3, and returning once again to STEP 120, if instead determining that the hybrid combine 10 is not engaged in active harvesting (STEP 120), the controller architecture 16 progresses to STEP 126 and establishes whether the combine is presently engaged in non-harvest transport. If determining the hybrid combine 10 is not presently engaged in non-harvest transport, the controller architecture 16 operates the intelligent power allocation system 12 in a standby or default mode. In this scenario, given that the combine hybrid combine 10 is not currently engaged in either non-harvest transport or active harvesting at this juncture of operation, the standby mode may be applied when the combine hybrid combine 10 is engaged in initial startup or, perhaps, when the hybrid combine 10 remains idle for a prolonged period of time. In such cases, the cumulative load placed on the combine hybrid combine 10 will typically be minimal, and the controller architecture 16 may shut-down the combine engine 24 for fuel savings in the standby mode; or, instead, the combine engine 24 may be utilized in recharging the rechargeable battery pack 100 during this period if the current SoC of the battery pack 100 is below a certain desired threshold; e.g., less than 100% of an optimal SoC value. This stated, the combine engine 24 may remain operative during the standby mode in other instances, depending upon the overall design of the hybrid combine 10. Following STEP 132, the controller architecture 16 again advances to STEP 138 and determines whether the current iteration of the intelligent power allocation method 116 should cease.

In instances in which the hybrid combine is engaged in non-harvest transport at STEP 126, the controller architecture 16 progresses to STEP 128 of the intelligent power allocation method 116. At STEP 128, the controller architecture 16 determines whether the current battery SoC of the battery pack 100 is above a minimum SoC threshold stored in the computer-readable memory 112; e.g., by querying the power electronics 102 or otherwise utilizing one or more sensors within the electric drive subsystem 74 for tracking the current battery charge state. In various implementations, the minimum SoC threshold may have variable value, which is dynamically adjusted by the controller architecture 16 to ensure that sufficient quantity of energy is retained within the battery pack 100 to allow the hybrid combine 10 to complete (or nearly complete) a return transport trip in the battery powered transport mode following active harvesting. In such implementations, the controller architecture 16 may estimate battery energy stores required for the hybrid combine 10 to complete such a return transport trip based upon, for example, operator input and/or the amount of battery stores expended during the outbound trip of the hybrid combine 10 when initially traveling to the crop filed or agricultural site at which active harvesting occurs. In other implementations, the intelligent power allocation system 12 may not perform such functions, and the minimum SoC threshold may have a static value established to, for example, avoid excessive drainage of the battery pack 100.

If determining the current battery SoC to be above the minimum SoC threshold during STEP 128, the controller architecture 16 operates (that is, initially places or continues to operate) the intelligent power allocation system 12 in a battery powered transport mode (STEP 136) before progressing to STEP 138 and determining whether the current iteration of the intelligent power allocation method 116 should terminate in the manner previously described. Generally, when the intelligent power allocation system 12 operates in the battery powered transport mode, the controller architecture 16 controls the electric drive subsystem 74 and, specifically, the electric ground traction motor 98 to power (mechanically drive) the movable components of the ground traction undercarriage 20 of the hybrid combine 10 in accordance with operator commands. Thus, in this case, the controller architecture 16 may monitor operator movements of the control lever 70 and translate such movements to corresponding command signals, which are then transmitted to the electric ground traction motor 98 to enable operator control of the ground speed of the hybrid combine 10. Additional discussion of an example battery powered transport mode is presented below in connection with FIG. 7.

If, during STEP 128, it is instead determined that current battery SoC is equal to or less than the minimum SoC threshold, the controller architecture 16 advances to STEP 134 and operates the intelligent power allocation system 12 in an engine powered transport mode. In the context of this power allocation mode (the engine powered transport mode), the combine engine 24 is utilized to exclusively or at least predominately power movement of the ground traction undercarriage 20 without reliance on (or with a highly reduced reliance on) the battery pack 100, while noting that the combine engine 24 may drive the undercarriage 20 through the electric drive subsystem 74 in at least some embodiments. In the latter regard, the combine engine 24 may drive the ground traction undercarriage 20 through the electric drive subsystem 74 by, for example, back-driving the M/G 78 to generate electrical power, which is then applied to the electric ground traction motor 98 to turn the output shaft 108 and thereby mechanically drive the ground traction undercarriage 20. Such power transfer and conversion processes are still considered to constitute mechanical driving of the ground traction undercarriage 20 by the combine engine 24 as the combine engine 24 (and, specifically, combustion of fuel within the chambers of engine 24) is the principal power source in this example, rather than electrical power drawn from the battery pack 100. In other instances, a direct mechanical connection may be provided between the combine engine 24 and the transmission 106, as further discussed below in connection with FIG. 8. Following STEP 134, the controller architecture 16 progresses to STEP 138 and determines whether additional iterations of the intelligent power allocation method 116 should be carried-out, as previously discussed.

By operating the intelligent power allocation system 12 in the battery powered transport mode when the hybrid is engaged in active transport and the current battery SoC is above the minimum SoC threshold, the controller architecture 16 minimize usage of the combine engine 24 to conserve fuel, reduce emissions, and promote overall efficiency of the hybrid combine 10. Noise levels occurring during combine transport are also minimized through the usage of the relatively quiet electric drive subsystem 74 rather than the combine engine 24. In this manner, by switching to operation in the engine powered transport mode when the current battery SoC is equal to or falls below the minimum SoC threshold, the controller architecture 16 employs the combine engine 24 to assist in powering or to exclusively power the ground traction undercarriage 20 during roadway transport when, for example, the battery pack 100 is depleted or otherwise falls below a predetermined SoC threshold. Generally, then, the intelligent power allocation method 116 is conducted by the controller architecture 16 to actively transition the intelligent power allocation system 12 between a number of different power allocation modes as best suited to accommodate the current operational needs of the hybrid combine 10, while avoiding excessive reliance on the combine engine 24 for fuel savings, cost savings, and emission reduction. Additionally, due to the unique due e-machine architecture of the electric drive subsystem 74, still further power allocation modes can be applied, if and when desired, by the controller architecture 16. For example, and as further discussed below in connection with FIG. 9, the intelligent power allocation system 12 may be further operable in an electric-drive assisted start mode in which the M/G 78 is utilized to temporarily back-drive or "turn-over" the combine engine 24 during engine startup. Additional description of several example power allocation modes will now be discussed in more detail in connection with FIGS. 4-9.

Figure 4:
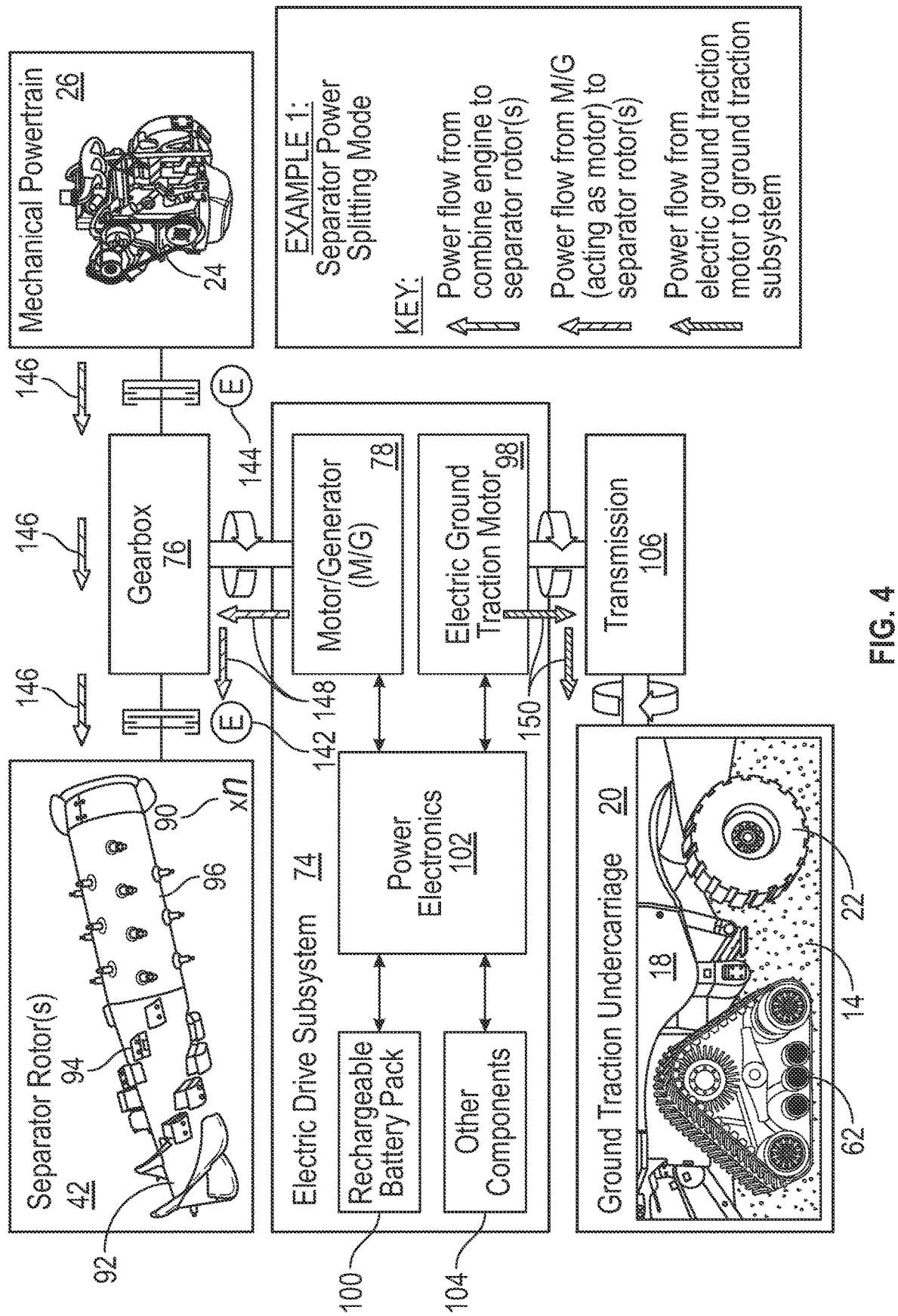
FIGS. 4-9 schematically illustrate several example power allocation modes in which the controller architecture may selectively place the intelligent power allocation system to best suit a range of operational scenarios encountered by the hybrid combine.

FIG. 4 schematically illustrates operation of the intelligent power allocation system 12 (partially shown) when placed in an example separator power splitting mode by the controller architecture 16. As indicated by symbols 142, 144 both clutches 84, 88 are engaged. Mechanical power flow transmitted from the combine engine 24, through the gearbox 76, and to the separator rotor 42, as indicated by arrows 146. Concurrently, the M/G 78 is energized, drawing from the battery pack 100, to further power rotation of the separator rotor 42 through the gearbox 76, as indicated by arrows 148. The gearbox 76 thus sums the rotary inputs provided by the combine engine 24 and the M/G 78 in the separator power splitting mode and transmits the summed rotary output to the separator rotor 42 through the driveline 82 and the clutch 84. The electric drive subsystem 74 is thus controller by the controller architecture 16 to leverage the available battery power supply and provide a motoring boost to assist the combine engine output should, for example, a slug or transient load spike occur during active harvesting by the combine harvester 10.

Ground propulsion of the hybrid combine 10 is further effectuated by energizing the electric ground traction motor 98, as appropriate and as indicated in FIG. 4 by arrows 150. Through the transmission of appropriate commands to the M/G 78 and to the electric ground traction motor 98, both powered utilizing the battery pack 100, the ground speed of the hybrid combine 10 can be controlled independently of the rotational speed of the separator rotor 42; e.g., as noted above, the ground speed of the hybrid combine 10 may be varied in accordance with operator input commands received via movement of the control lever 70, potentially while mimicking the behavior of legacy hydraulic drive systems. Further, the rotational output speed and torque of the M/G 78 may be varied by the controller architecture 16 to, for example, to increase the power output of the M/G 78 should the separator rotor load continue to increase after initially surpassing the upper load threshold. In this manner, the controller architecture 16 can control the M/G 78 and, more broadly, the electric drive subsystem 74 to reduce peak loading on the combine engine 24. This, in turn, allows engine downsizing and boosts engine efficiency by promoting rotation of the engine output shaft within an optimized speed range.

Notably, in the separator power splitting mode shown in FIG. 4, the controller architecture 16 of the intelligent power allocation system 12 can vary the respective power outputs of the M/G 78 and the combine engine 24 in accordance with predetermined torque curves and optimized control schemes. For example, in at least some embodiments, the controller architecture 16 may control the power output of the M/G 78 and the combine engine 24 to satisfy target power outputs specified by one or more torque curves, which are stored in the computer-readable memory 112 and which plot target power outputs relative to shaft speeds. Advantageously, such a torque curve-based control scheme may be tailored to compensate for rapid increases or ramp-ups in torque demands placed on the intelligent power allocation system 12 at lower output shaft speeds. In this regard, combine engines commonly experience relatively sharp increases in torque demands over shaft speed ranges falling below the rated operating speed of a combine engine; e.g., as a non-limiting example, torque demands placed on a combine engine often increase by 30% or more over shaft speeds ranging from about 5 to about 600 rotations per minute (RPM) below the rated operating speed of the engine. In the case of non-hybrid combine platforms, such peak torque demands are borne solely by the combine's internal combustion engine, thus typically necessitating powertrain systems with larger internal combustion engines to satisfy such peak torque demands. In the case of the intelligent power allocation system 12, by contrast, the M/G 78 can be leveraged to relieve peak torque demands placed on the combine engine 24 through intelligent load sharing or power splitting schemes, while providing torque curves (e.g., as measured at the summed output of the gearbox 76) matching or substantially matching torque curves established in the context of non-hybrid combines. Thus, utilizing such an approach in the context of the intelligent power allocation system 12, the combine engine 24 may be controlled to provide substantially constant power (peak power) across a relatively broad RPM range to increase the efficiency of the combine engine 24. Engine downsizing is also enabled as the M/G 78 provides power output assistance aiding the combine engine 24 in powering rotor rotation and other combine functions under peak load conditions; e.g., in the event of rapid torque demand increases or "power bulges" occurring in conjunction with lower shaft rotational rates due to, for example, slug loading of the hybrid combine 10.

Figure 5:
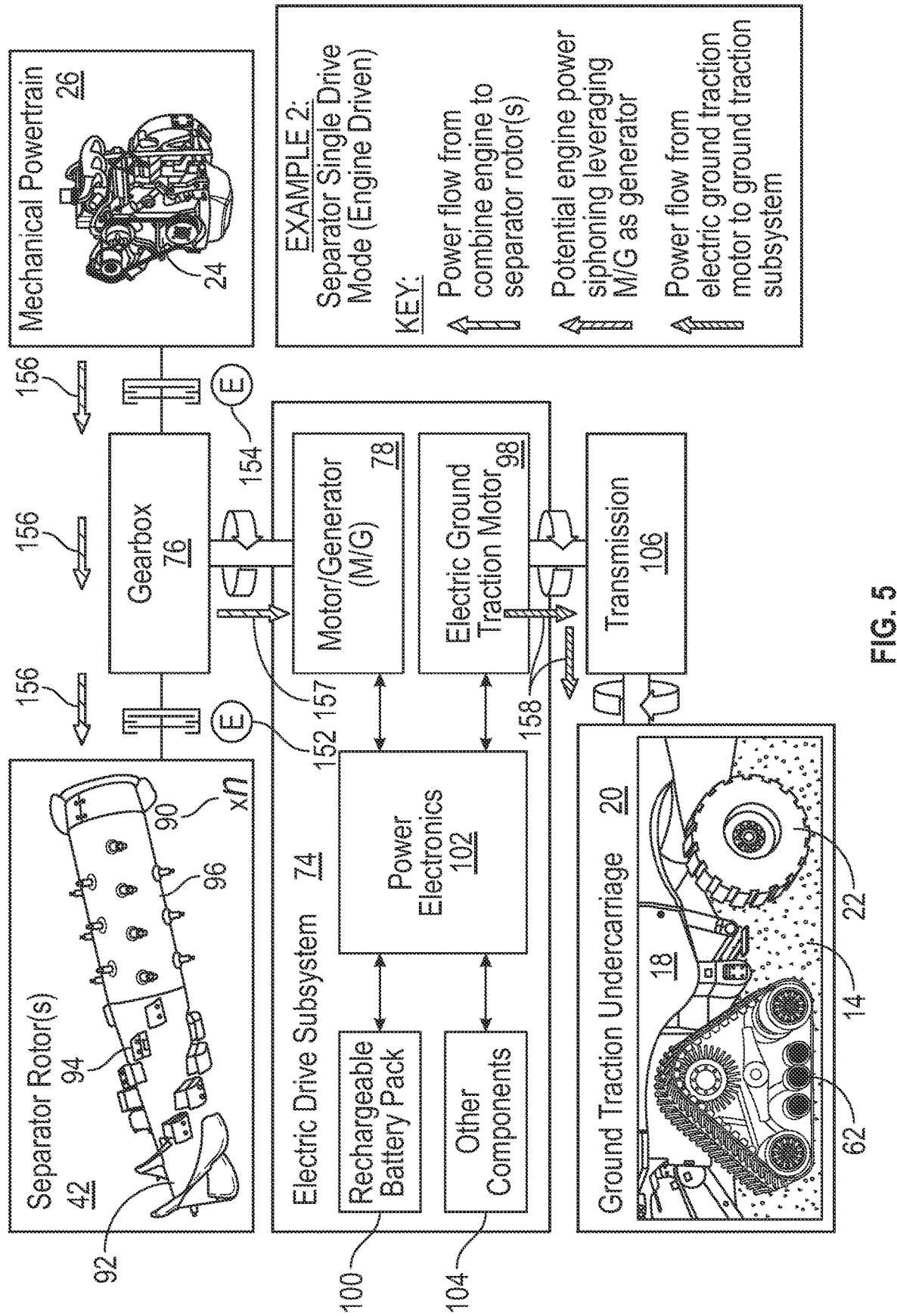
Figure 6:
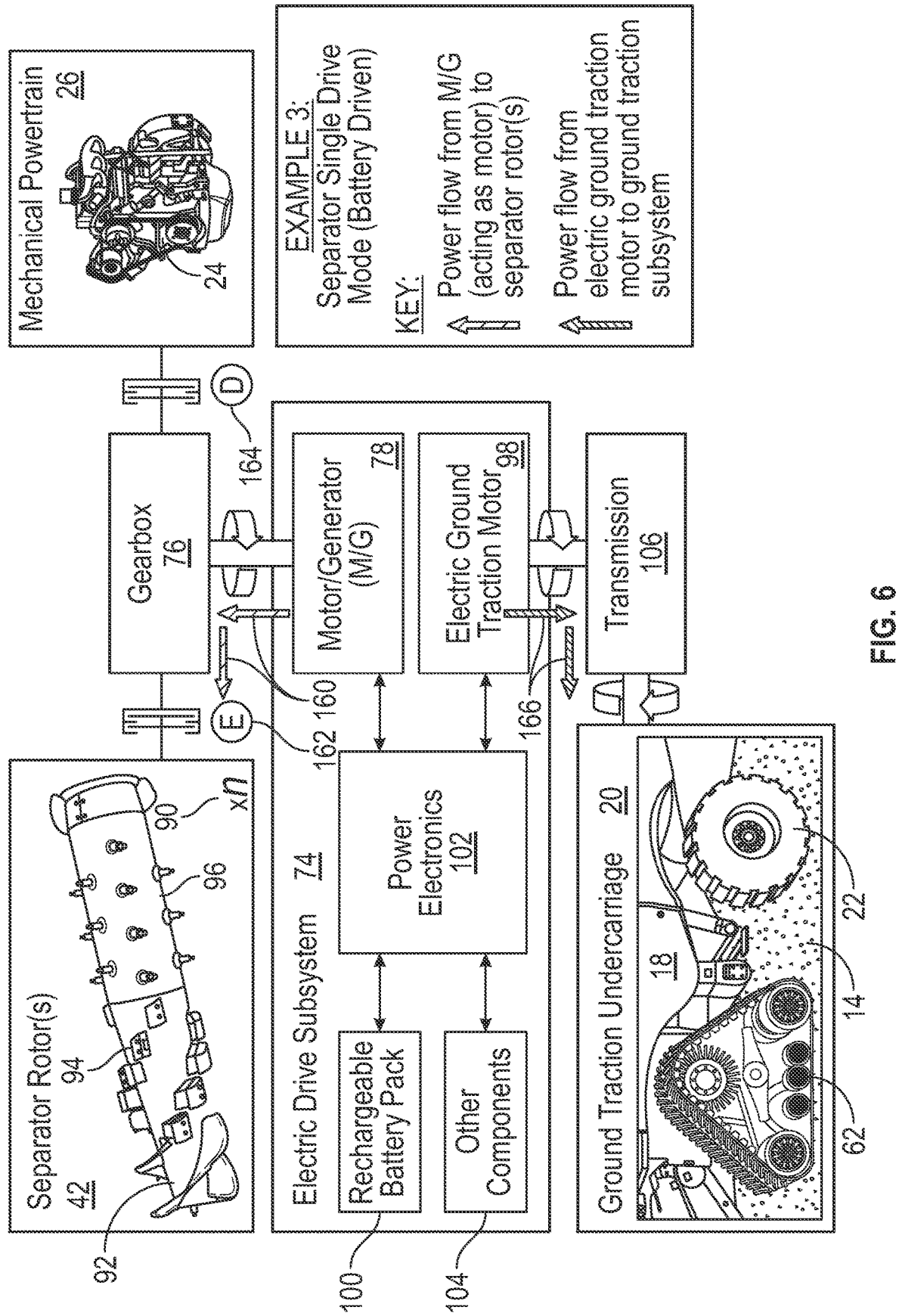

FIG. 5 schematically illustrates operation of the intelligent power allocation system 12 (partially shown) when placed in an example separator single drive mode in which the combine engine 24 exclusively powers rotation of the separator rotor 42. Once again, both clutches 84, 88 remain engaged in this operational mode, as indicated by the symbols 152, 154, respectively. As indicated by arrows 156, power flow (mechanical power transfer) occurs from the combine engine 24, through the gearbox 76, and to the separator rotor 42 to drive rotor rotation. As a further possibility, and as indicated by arrow 148, the controller architecture 16 may control the electric drive subsystem 74 to selectively permit back-driving of the M/G 78 through the gearbox 76 by the combine engine 24. This may be useful when, for example, the current SoC of the rechargeable battery pack 100 becomes undesirably low. Additionally or alternatively, the intelligent power allocation system 12 may cause the combine engine 24 to both drive rotation of the separator rotor 42 and to concurrently back-drive the M/G 78 under certain operation conditions, such as under moderate to light separator load conditions. In this latter regard, the controller architecture 16 may selectively enable back-driving of the M/G 78 when the separator load decreases below a lower load threshold, with this power flow indicated by an arrow 157. Rotation of the combine engine shaft within an optimized quasi-isochronous range may be promoted to provide load leveling of the combine engine 24.

This, in turn, boosts engine performance and efficiency, while reducing emissions and recharging the battery pack 100 at opportune moments during combine operation; e.g., until the separator load again increases above the lower load threshold or the intelligent power allocation system 12 switches into a different mode of operation. Finally, as indicated in FIG. 5 by arrows 158, the electric ground traction motor 98 may be utilized to power the propulsive functions of the hybrid combine 10 through the transmission 106, as needed, during operation in the example separator single drive mode.

In the above-described example, the combine engine 24 is utilized to drive separator rotor rotation when the intelligent power allocation system 12 is placed in the separator single drive mode. Generally, providing such a selective power boost function utilizing the electric drive subsystem enables engine downsizing, which, in turn, reduces component cost and promotes efficient engine operation. This stated, the electric drive subsystem 74 may be utilized to drive rotation of the separator rotor 42 under light to moderate load conditions, with the combine engine 24 utilized to provide additional power assistance depending upon the electric drive subsystem capabilities and other design aspects of the hybrid combine 10. In this latter case, and referring now to FIG. 6, the M/G 78 may be utilized to drive separator rotor rotation through the gearbox 76, as indicated by arrows 160 and the symbol 162 indicating the engaged state of the clutch 84. Concurrently, the controller architecture 16 may disengage the clutch 88, as indicated by the symbol 164, to prevent energy losses through back-driving of the combine engine 24; although this is not necessary in all implementations. Once again, the electric ground traction motor 98 is simultaneously controlled, as appropriate, to supply mechanical power output to the ground traction undercarriage 20 through the transmission (indicated by arrows 166) to vary the ground speed and direction of the hybrid combine 10 in accordance with operator commands. Lastly, it will be appreciated that, should the SoC of the battery pack 100 become overly depleted or otherwise fall below a predetermined threshold value, the combine engine 24 may again be leveraged to drive rotation of the separator rotor 42 exclusively or in combination with the M/G 78. Additionally, in such instances, the combine engine 24 may effectively power or help power the ground traction undercarriage 20 by generating electrical power through the back-driving of M/G 78, with the electrical power then applied to electric ground traction motor 98 (potentially bypassing the battery pack 100) and converted to rotary output motion supplied to the undercarriage 20 in the manner previously described.

Figure 7:
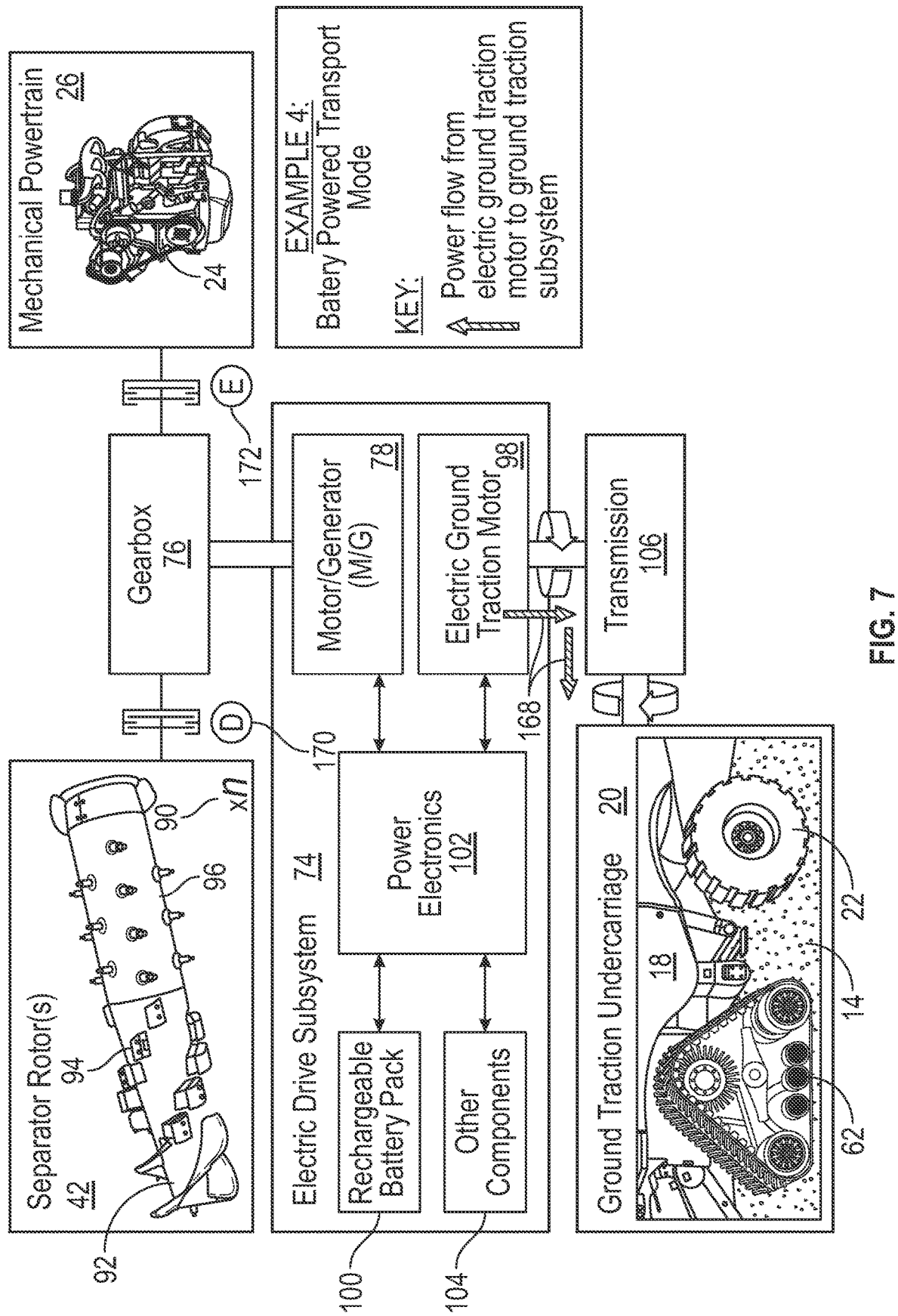
Figure 8:
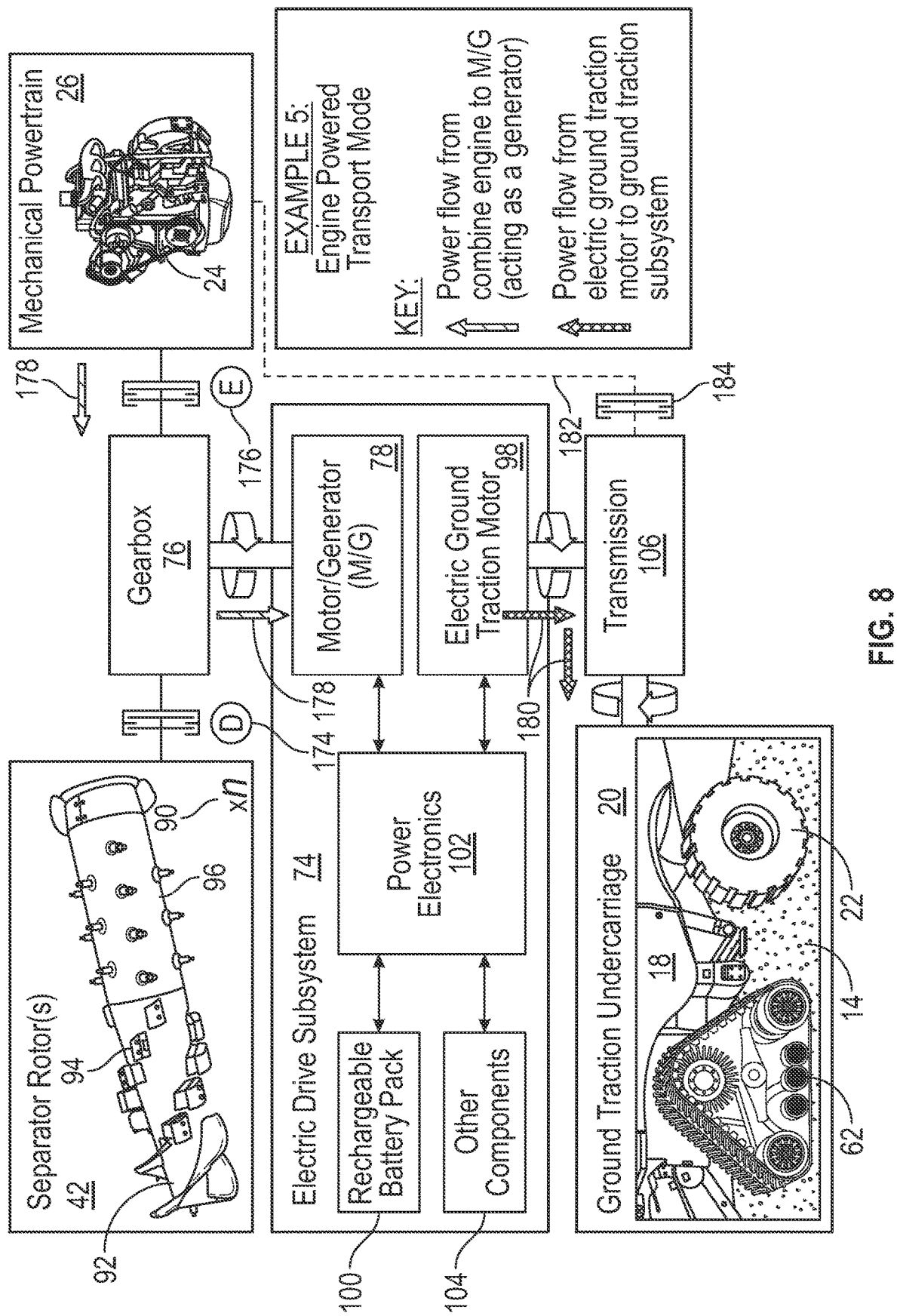

The intelligent power allocation system 12 is further operable in a battery powered transport mode and an engine powered transport mode, examples of which are depicted in FIGS. 7 and 8, respectively. Referring first to FIG. 7, an example battery powered transport mode is shown in which the electric ground traction motor 78 drives motion of the ground traction undercarriage 20 through the transmission 106, as indicated by arrows 168. The clutches 84, 88 may be disengaged and engaged, respectively, as indicated by symbols 170, 172; although this may vary between embodiments. When placed in this mode, the intelligent power allocation system utilizes the electric drive subsystem 74 to power the ground traction undercarriage 20 and thereby propel the hybrid combine over roadways or other terrain. Through the usage of battery power when the combine hybrid combine 10 is engaged in transport, the usage of the combine engine 24 may be minimized to conserve fuel and reduce emissions. Noise levels occurring during combine transport are also minimized through the usage of the relatively quiet electric drive subsystem 74.

Although not shown in FIG. 7, the combine engine 24 may be utilized to selectively back-drive the M/G 78 and recharge the battery pack 100 if the SoC of the battery pack 100 becomes undesirably low and recharging is warranted. Additionally or alternatively, the controller architecture 16 may transition the intelligent power allocation system 12 to operation in the engine powered transport mode when the current SoC of the battery pack 100 falls below a minimum SoC threshold. As shown in FIG. 8 and indicated by symbols 174, 176, the clutches 84, 88 may placed in disengaged and engaged states, respectively. As indicated by arrows 178, the combine engine 24 may drive the ground traction undercarriage 20 through the electric drive subsystem 74 by, for example, back-driving the M/G 78 to generate electrical power. The electrical power may then be applied to the electric ground traction motor 98 (e.g., potentially bypassing the battery pack 100) to turn the output shaft 108 and drive the ground traction undercarriage 20, as further denoted by arrows 180. A noted above, such power transfer and conversion processes are considered to constitute primary driving of the ground traction undercarriage 20 by the combine engine 24 as the combine engine 24 (and, specifically, combustion of fuel by the engine 24) is the principal power source in this example, rather than electrical power drawn from the battery pack 100. Alternatively, in embodiments and as indicated in FIG. 8 by phantom line, a direct mechanical (driveline) connection 182 may be provided between the combine engine 24 and the transmission 106. In this case, a clutch 184 may be provided in the direct mechanical path and engaged in the engine powered transport mode, while disengaged in other modes to prevent energy losses through back-driving of the combine engine 24.

Figure 9:
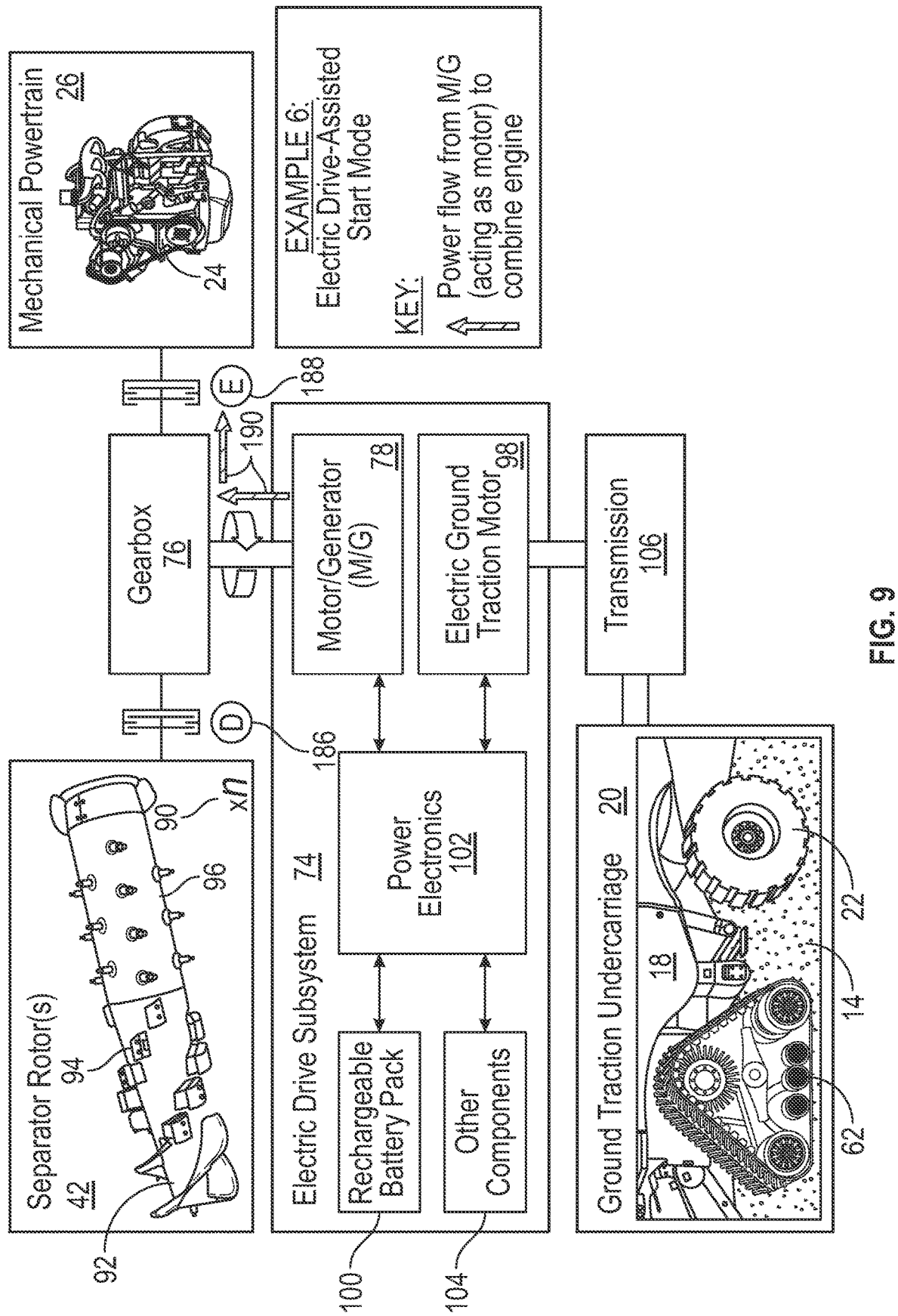

Embodiments of the intelligent power allocation system 12 may be operable in yet further power allocation mode, such as an electric drive-assisted start mode. An example of such an electric drive-assisted start mode is shown in FIG. 9. Here, clutches 84, 88 may be disengaged and engaged, respectively, as indicated by symbols 186, 188. Further, rotational motion is imparted to the combine engine 24 during startup or "turn-over" of the engine by providing rotary motion transfer from the M/G 78, through the gearbox 76, and to the engine shaft, as indicated by arrows 190. In such embodiments, the gearbox 76 usefully possesses a dual ratio in the forward and reverse directions to provide an appropriate slower speed, higher torque output to the engine shaft when reverse driven by the M/G 78 during the electric-drive assisted mode. Generally, then, the M/G 78 is utilized to back-drive the combine engine 24 during engine startup, as may be particularly useful when the combine engine 24 is repeatedly shutdown and reactivated during hybrid combination 10 operation in conjunction with switching between different power allocation modes, as previously described. This notwithstanding, the controller architecture 16 may not utilize the M/G 78 to assist in engine startup in other embodiments of the intelligent power allocation system 12. More generally, in this regard, embodiments of the intelligent power allocation system 12 may be operable in all of the power allocation modes described above in connection with FIGS. 3-9, only a subset of these power allocation modes (including the separator power splitting mode), and/or any number of additional power allocation modes enabled utilizing the above-discussed system architecture or other such system architectures combining a combine engine with an electric drive subsystem containing at least one e-machine in the form of a motor/generator and advantageously containing at least two e-machines arranged in, for example, a dual e-machine arrangement similar or identical to that described in connection with FIG. 2.

Enumerated Examples of the Intelligent Power Allocation System

The following examples of the intelligent power allocation system, as deployed onboard a hybrid combine harvester, are further provided and numbered for ease of reference.

1. In a first example embodiment, an intelligent power allocation system includes a ground traction undercarriage controllable to propel the hybrid combine over terrain, a separator device (e.g., a separator rotor) configured to separate grain from other crop material ingested by the hybrid combine, a mechanical powertrain including an internal combustion engine mechanically linked to the separator device, and an electric drive subsystem mechanically linked to the separator device and to the ground traction undercarriage. The electric drive subsystem contains a rechargeable battery pack and a motor/generator (M/G) electrically coupled to the rechargeable battery pack. A controller architecture is coupled to the mechanical powertrain and to the electric drive subsystem. The controller architecture is configured to: (i) monitor a current separator load placed on the hybrid combine when driving movement of the separator device (e.g., rotation of a separator rotor) during active harvesting; and (ii) based, at least in part, on whether the current separator load exceeds an upper load threshold, selectively place the intelligent power allocation system in a separator power splitting mode in which the M/G and the internal combustion engine concurrently drive movement of the separator device.

2. The intelligent power allocation system of example 1, wherein the controller architecture is further configured to selectively transition between the separator power splitting mode and a separator single drive mode during operation of the hybrid combine.

3. The intelligent power allocation system of example 2, wherein the controller architecture is configured to place the hybrid combine in the separator single drive mode when the current separator load is equal to or less than the upper load threshold during active harvesting.

4. The intelligent power allocation system of example 2, wherein the internal combustion engine exclusively powers movement of the separator device (e.g., rotation of a separator rotor) in the separator single drive mode.

5. The intelligent power allocation system of example 4, wherein the controller architecture is configured to selectively enable back-driving of the M/G by the internal combustion engine when the intelligent power allocation system is placed in in the separator single drive mode.

6. The intelligent power allocation system of example 2, further including a gearbox mechanically coupling the internal combustion engine and the M/G to the separator device. Additionally, a clutch is mechanically coupled between a rotary input of the gearbox and an output shaft of the internal combustion engine.

7. The intelligent power allocation system of example 6, wherein the M/G exclusively powers movement of the separator device in the separator single drive mode, while the clutch is disengaged to prevent back-driving of the internal combustion engine.

8. The intelligent power allocation system of example 2, wherein the controller architecture is configured to transition the intelligent power allocation system from operation in the separator power splitting mode to operation in the separator single drive mode when a current state of charge (SoC) of the rechargeable battery pack is less than a minimum SoC threshold.

9. The intelligent power allocation system of example 8, wherein the controller architecture is configured to vary the minimum SoC threshold based, at least in part, on an estimation of battery energy stores required for the hybrid combine to complete a return transport trip.

10. The intelligent power allocation system of example 1, wherein the controller architecture is further configured to: (i) determine when the hybrid combine is engaged in non-harvest transport; and (ii) selectively place the hybrid combine in a battery powered transport mode when the hybrid combine is engaged in non-harvest transport and a current state-of-charge (SoC) of the rechargeable battery pack exceeds a minimum SoC threshold.

11. The intelligent power allocation system of example 10, wherein the controller architecture is further configured to place the hybrid combine in an engine powered transport mode when the hybrid combine is engaged in non-harvest transport and the current SoC of the rechargeable battery pack is equal to or less than the minimum SoC threshold.

12. The intelligent power allocation system of example 11, further including a gearbox mechanically coupling the internal combustion engine to the separator device and to the M/G.

13. The intelligent power allocation system of example 12, wherein the controller architecture selectively enables back-driving of the M/G by the internal combustion engine when the intelligent power allocation system is placed in the engine powered transport mode.

14. The intelligent power allocation system of example 1, wherein the controller architecture is further configured to selectively place the intelligent power allocation system in an electric drive-assisted start mode during which the M/G is utilized to back-drive the internal combustion engine during engine startup.

15. The intelligent power allocation system of example 1, wherein the M/G includes a first shaft mechanically linked to the internal combustion engine and to the separator device. Also, the electric drive subsystem further includes an electric ground traction motor including a second shaft mechanically linked to the ground traction undercarriage.

Conclusion

There has thus been provided embodiments of intelligent power allocation system for usage onboard hybrid combines. During active harvesting, embodiments of the intelligent power allocation system transition between operation in (i) a separator single drive mode in which the combine engine or an electric drive subsystem power separator rotor rotation (or movement of another type of separator device, such as rotation of a tangentially-fed rotor) and possibly other harvesting-related functions of the combine harvester, and (ii) a separator power splitting mode in which the electric drive subsystem and the combine engine jointly or concurrently drive rotation of the separator rotor. The intelligent power allocation system may further be operable in any number of additional power allocation modes including, for example, a battery powered transport mode in which the electric drive subsystem powers the ground traction undercarriage of the hybrid combine to reduce reliance on the combine engine and fuel usage during roadway transport. In certain embodiments of the intelligent power allocation system, the electric drive subsystem may contain a dual e-machine architecture including a motor/generator (a first e-machine) linked to the separator rotor or rotors onboard the hybrid combine and further including an electric ground traction motor (a second e-machine) linked to the ground traction undercarriage. In other embodiments, the electric drive subsystem may contain a single e-machine in the form of a motor/generator. In either instance, through the strategic application of such power allocation modes as selected to best suit different hybrid combine operational scenarios, the intelligent power allocation system can provide cost savings, increase fuel savings, minimize emission levels, reduce roadway transport noise, and provide other benefits relative to conventional hybrid combines and combine harvesters exclusively through internal combustion engines.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An intelligent power allocation system onboard a hybrid combine, the intelligent power allocation system comprising:
   a ground traction undercarriage controllable to propel the hybrid combine over terrain;
   a separator device configured to separate grain from other crop material ingested by the hybrid combine;
   a mechanical powertrain including an internal combustion engine mechanically linked to the separator device;
   an electric drive subsystem mechanically linked to the separator device and to the ground traction undercarriage, the electric drive subsystem containing a rechargeable battery pack and a motor/generator (M/G) electrically coupled to the rechargeable battery pack; and
   a controller architecture coupled to the mechanical powertrain and to the electric drive subsystem, the controller architecture configured to:
      monitor a current separator load placed on the hybrid combine when driving movement of the separator device during active harvesting; and
      based, at least in part, on whether the current separator load exceeds an upper load threshold, selectively place the intelligent power allocation system in a separator power splitting mode in which the M/G and the internal combustion engine concurrently drive movement of the separator device.

2. The intelligent power allocation system of claim 1, wherein the controller architecture is further configured to selectively transition between the separator power splitting mode and a separator single drive mode during operation of the hybrid combine.

3. The intelligent power allocation system of claim 2, wherein the controller architecture is configured to place the hybrid combine in the separator single drive mode when the current separator load is equal to or less than the upper load threshold during active harvesting.

4. The intelligent power allocation system of claim 2, wherein the internal combustion engine exclusively powers movement of the separator device in the separator single drive mode.

5. The intelligent power allocation system of claim 4, wherein the controller architecture is configured to selectively enable back-driving of the M/G by the internal combustion engine when the intelligent power allocation system is placed in the separator single drive mode.

6. The intelligent power allocation system of claim 2, further comprising:
   a gearbox mechanically coupling the internal combustion engine and the M/G to the separator device; and
   a clutch mechanically coupled between a rotary input of the gearbox and an output shaft of the internal combustion engine.

7. The intelligent power allocation system of claim 6, wherein the M/G exclusively powers movement of the separator device in the separator single drive mode, while the clutch is disengaged to prevent back-driving of the internal combustion engine.

8. The intelligent power allocation system of claim 2, wherein the controller architecture is configured to transition the intelligent power allocation system from operation in the separator power splitting mode to operation in the separator single drive mode when a current state of charge (SoC) of the rechargeable battery pack is less than a minimum SoC threshold.

9. The intelligent power allocation system of claim 8, wherein the controller architecture is configured to vary the minimum SoC threshold based, at least in part, on an estimation of battery energy stores required for the hybrid combine to complete a return transport trip.

10. The intelligent power allocation system of claim 1, wherein the controller architecture is further configured to:
    determine when the hybrid combine is engaged in non-harvest transport; and
    selectively place the hybrid combine in a battery powered transport mode when the hybrid combine is engaged in non-harvest transport and a current state-of-charge (SoC) of the rechargeable battery pack exceeds a minimum SoC threshold.

11. The intelligent power allocation system of claim 10, wherein the controller architecture is further configured to place the hybrid combine in an engine powered transport mode when the hybrid combine is engaged in non-harvest transport and the current SoC of the rechargeable battery pack is equal to or less than the minimum SoC threshold.

12. The intelligent power allocation system of claim 11, further comprising a gearbox mechanically coupling the internal combustion engine to the separator device and to the M/G.

13. The intelligent power allocation system of claim 12, wherein the controller architecture selectively enables back-driving of the M/G by the internal combustion engine when the intelligent power allocation system is placed in the engine powered transport mode.

14. The intelligent power allocation system of claim 1, wherein the controller architecture is further configured to selectively place the intelligent power allocation system in an electric drive-assisted start mode during which the M/G is utilized to back-drive the internal combustion engine during engine startup.

15. The intelligent power allocation system of claim 1, wherein the M/G includes a first shaft mechanically linked to the internal combustion engine and to the separator device; and
   wherein the electric drive subsystem further comprises an electric ground traction motor including a second shaft mechanically linked to the ground traction undercarriage.

16. The intelligent power allocation system of claim 15, wherein the controller architecture is configured to selectively drive the M/G to power to the separator device, while concurrently controlling the electric ground traction motor to power the ground traction undercarriage when the current separator load exceeds the upper load threshold.

17. The intelligent power allocation system of claim 15, further comprising a control lever located in a cab of the hybrid combine and electrically coupled to the controller architecture; and
   wherein the controller architecture is configured to command the electric ground traction motor to selectively vary a ground speed of the hybrid combine in accordance with operator movement of the control lever in a manner mimicking a hydrostatic drive.

18. A method carried-out by a controller architecture included in an intelligent power allocation system onboard a hybrid combine, the hybrid combine further including a separator rotor, an internal combustion engine, and an electric drive subsystem containing a motor/generator (M/G) and a rechargeable battery pack, the method comprising:
   monitoring, at the controller architecture, a current separator load placed on the hybrid combine when driving rotation of the separator rotor during active harvesting; and
   based, at least in part, on whether the current separator load exceeds an upper load threshold, selectively placing the intelligent power allocation system in a separator power splitting mode in which the M/G and the internal combustion engine concurrently drive rotation of the separator rotor.

19. The method of claim 18, further comprising selectively transitioning, via the controller architecture, the intelligent power allocation system between the separator power splitting mode and a separator single drive mode when the current separator load is equal to or less than the upper load threshold during active harvesting.

20. The method of claim 18, further comprising:
   determining, at the controller architecture, when the hybrid combine is engaged in non-harvest transport; and
   selectively placing the hybrid combine in a battery powered transport mode when the hybrid combine is engaged in non-harvest transport and a current state-of-charge (SoC) of the rechargeable battery pack exceeds a minimum SoC threshold.

\* \* \* \* \*